(12) United States Patent
Young et al.

(10) Patent No.: US 9,718,302 B2
(45) Date of Patent: Aug. 1, 2017

(54) DECORATIVE LAMINATE WITH NON-VISIBLE LIGHT ACTIVATED MATERIAL AND SYSTEM AND METHOD FOR USING THE SAME

(71) Applicant: The Boeing Company, Chicago, IL (US)

(72) Inventors: Stephen M. Young, Mill Creek, WA (US); Carl A. Davison, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/862,082

(22) Filed: Sep. 22, 2015

(65) Prior Publication Data

US 2017/0080747 A1   Mar. 23, 2017

(51) Int. Cl.
| | |
|---|---|
| *B32B 3/10* | (2006.01) |
| *B44F 1/10* | (2006.01) |
| *B32B 7/12* | (2006.01) |
| *B32B 27/08* | (2006.01) |
| *B32B 27/30* | (2006.01) |
| *B32B 15/082* | (2006.01) |
| *B32B 15/20* | (2006.01) |

(52) U.S. Cl.
CPC .................. *B44F 1/10* (2013.01); *B32B 3/10* (2013.01); *B32B 7/12* (2013.01); *B32B 15/082* (2013.01); *B32B 15/20* (2013.01); *B32B 27/08* (2013.01); *B32B 27/304* (2013.01); *B32B 2255/10* (2013.01); *B32B 2451/00* (2013.01); *B32B 2605/18* (2013.01)

(58) Field of Classification Search
CPC ......... B32B 27/30; B32B 3/10; B32B 27/302; B32B 27/304; B32B 27/306; B32B 27/308

USPC ......... 428/29.201, 204, 913.3, 29, 201, 203; 283/85–94, 107–114; 293/85–4, 107–114
See application file for complete search history.

(56) References Cited

U.S. PATENT DOCUMENTS

| | | | |
|---|---|---|---|
| 5,085,921 A | 2/1992 | Jayarajan | |
| 5,380,695 A * | 1/1995 | Chiang | B41M 3/14 283/109 |
| 5,976,671 A | 11/1999 | Gleim | |
| 6,092,915 A | 7/2000 | Rensch | |
| 8,540,914 B2 | 9/2013 | Wilde et al. | |
| 8,986,816 B2 | 3/2015 | Zielinski et al. | |

(Continued)

OTHER PUBLICATIONS

Drexler, Jason W., et al., "Nonwoven Decorative Laminates and Methods of Making the Same", U.S. Appl. No. 14/496,469, filed Sep. 25, 2014, 40 pages.

*Primary Examiner* — Bruce H Hess

(57) ABSTRACT

There is provided a decorative laminate having a first laminate layer, a second laminate layer, and a decorative layer disposed selectively between the first laminate layer and the second laminate layer. The decorative layer includes one or more visible materials, and one or more non-visible light activated materials that change from a non-visible state to a visible state when exposed to a light source. The light source includes an ultraviolet (UV) light source or an infrared (IR) light source. The decorative laminate further has a resin layer disposed on the second laminate layer. The first laminate layer, the decorative layer, the second laminate layer, and the resin layer are laminated together to form the decorative laminate configured for application to a structural component.

20 Claims, 11 Drawing Sheets

(56) References Cited

U.S. PATENT DOCUMENTS

2002/0182957 A1  12/2002  Levenda
2014/0339298 A1* 11/2014  Lacoste .................. C09J 7/0296
                                                    235/375

* cited by examiner

DECORATIVE LAMINATE WITH NON-VISIBLE LIGHT ACTIVATED MATERIAL AND SYSTEM AND METHOD FOR USING THE SAME

BACKGROUND

1) Field of the Disclosure

The disclosure relates generally to decorative laminates and systems and methods of using the same, and more particularly, to decorative laminates having non-visible light activated material and systems and methods of using the same, where the decorative laminates are used on structural components, such as aircraft interior structural components.

2) Description of Related Art

Decorative laminates are used in a wide variety of applications, including for surfaces of walls, countertops, and other structures, such as interior structural components of aircraft. For example, decorative laminates may be applied to the surfaces of such aircraft interior structural components as cabin interior sidewall and ceiling panels, floor panels, stowage bins, lavatory and galley panels and structures, bulkhead partitions, window shades, and other aircraft interior structural components.

Decorative laminates typically include a base or substrate layer which may be embossable to provide the decorative laminate with texture, a decorative layer that overlies the base or substrate layer, and a top layer that overlies the decorative layer. Other layers may be included between the base or substrate, decorative and top layers in specific decorative laminates, depending upon the nature of the materials used and the desired laminate characteristics. The decorative layer may be printed with various patterns and colors to provide a decorative effect to the decorative laminate.

Decorative laminates may be manufactured by printing, embossing, molding, and/or laminating the layers of the decorative laminate using a high temperature and pressure lamination and embossing forming process. The formed decorative laminate may then be bonded to a surface of structural component, such as an aircraft interior structural component via adhesive or another bonding agent.

In the manufacture and assembly of composite panels, such as aircraft interior composite panels, that have decorative laminates applied to the composite panels, the decorative laminates are typically positioned and placed onto the composite panels. Positional reference markings or labels may be provided around the periphery or edge of a decorative pattern or area of the decorative laminate to provide reference information to determine where to align, position, and place the decorative laminate on the composite panel.

However, when the decorative laminate is trimmed and shaped prior to assembly into a finished product, such positional reference markings or labels around the periphery or edge of the decorative pattern or area may be removed to avoid marring the decorative surface and/or to avoid visibility on the finished composite panel product. Such removal of the positional reference markings or labels may result in difficulty with later inspections to determine whether a decorative laminate has been applied correctly. In addition, if decorative laminates are not aligned properly on the composite panels, such misalignment may not be discovered until final assembly and may result in having to discard the misaligned decorative laminates as scrap. This may, in turn, result in decreased manufacturing efficiency and increased manufacturing time and costs.

Moreover, in the manufacture and assembly of composite panels, such as aircraft interior composite panels, that have decorative laminates applied to the composite panels, non-decorative information or markings, such as part numbers, bar codes, repair instructions, or other non-decorative information, may be included to locate and identify components for repair, removal, or maintenance. Such non-decorative information or markings may be included on the back surface or non-visible surface of the composite panel to avoid visibility on the visible surface of the finished composite panel product. However, it may be difficult to later locate and identify such non-decorative information or markings without disassembling or removing the finished composite panel product in some way to access the information. This may, in turn, result in increased time, labor and costs for maintenance and repair of such finished composite panel products.

In addition, decorative laminates applied to structural components, such as aircraft interior structural components, may be printed with branding features, patterns, or other decorative elements to improve interior branding opportunities and/or to improve the aesthetics of the interior space or area. However, known decorative laminate systems and methods may not provide for multiple interior designs or branding features within the same space or area that may each be selectively visible or non-visible.

Accordingly, there is a need in the art for an improved decorative laminate and system and method of using the same that provide advantages over known decorative laminates, systems, and methods.

SUMMARY

Example implementations of the present disclosure provide an improved decorative laminate and system and method for using the same that provide advantages over known decorative laminates, systems, and method. As discussed in the below detailed description, embodiments of the improved decorative laminate and system and method of using the same may provide significant advantages over existing decorative laminates, and systems and methods of using the same.

In an embodiment of the disclosure, there is provided a decorative laminate. The decorative laminate comprises a first laminate layer, a second laminate layer, and a decorative layer disposed selectively between the first laminate layer and the second laminate layer.

The decorative layer comprises one or more visible materials. The decorative layer further comprises one or more non-visible light activated materials that change from a non-visible state to a visible state when exposed to a light source. The light source comprises an ultraviolet (UV) light source or an infrared (IR) light source.

The decorative laminate further comprises a resin layer disposed on the second laminate layer. The first laminate layer, the decorative layer, the second laminate layer, and the resin layer are laminated together to form the decorative laminate configured for application to a structural component.

In another embodiment of the disclosure, there is provided a decorative laminate system. The decorative laminate system comprises a structural component having a bonding surface. The decorative laminate system further comprises a decorative laminate applied to the bonding surface of the structural component.

The decorative laminate comprises a first laminate layer having a transparent appearance. The decorative laminate further comprises a second laminate layer having an opaque appearance. The first laminate layer and the second laminate layer each comprise a thermoplastic fluoropolymer material selected from the group consisting of polyvinyl fluoride (PVF) film, polyvinylidene fluoride (PVDF) film, integral color polyvinyl fluoride (PVF) film, and polyvinyl fluoride (PVF) film/aluminum foil/adhesive material.

The decorative laminate further comprises a decorative layer disposed between the first laminate layer and the second laminate layer. The decorative layer comprises one or more visible materials. The decorative layer further comprises one or more non-visible light activated materials. The decorative laminate further comprises a resin layer disposed on the second laminate layer.

The decorative laminate system further comprises an adhesive layer disposed between the decorative laminate and the bonding surface of the structural component. The decorative laminate system further comprises a lighting system having a light source configured to illuminate and change the one or more non-visible light activated materials from a non-visible state to a visible state. The light source comprises an ultraviolet (UV) light source or an infrared (IR) light source.

In another embodiment of the disclosure, there is provided a method of making a composite panel having a decorative laminate applied thereto. The method comprises the step of depositing a decorative layer between a first laminate layer and a second laminate layer.

The decorative layer comprises one or more visible materials. The decorative layer further comprises one or more non-visible light activated materials that change from a non-visible state to a visible state, when exposed to a light source. The light source comprises an ultraviolet (UV) light source or an infrared (IR) light source.

The method further comprises the step of applying a resin layer to the second laminate layer. The method further comprises the step of forming a decorative laminate by layering sequentially and laminating together at a specified heat and a specified pressure the first laminate layer, the decorative layer, the second laminate layer, and the resin layer.

The method further comprises the step of curing a structural composite panel to form a cured structural composite panel. The method further comprises the step of applying with an adhesive layer the decorative laminate to a bonding surface of the cured structural composite panel to form the composite panel having the decorative laminate applied thereto.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
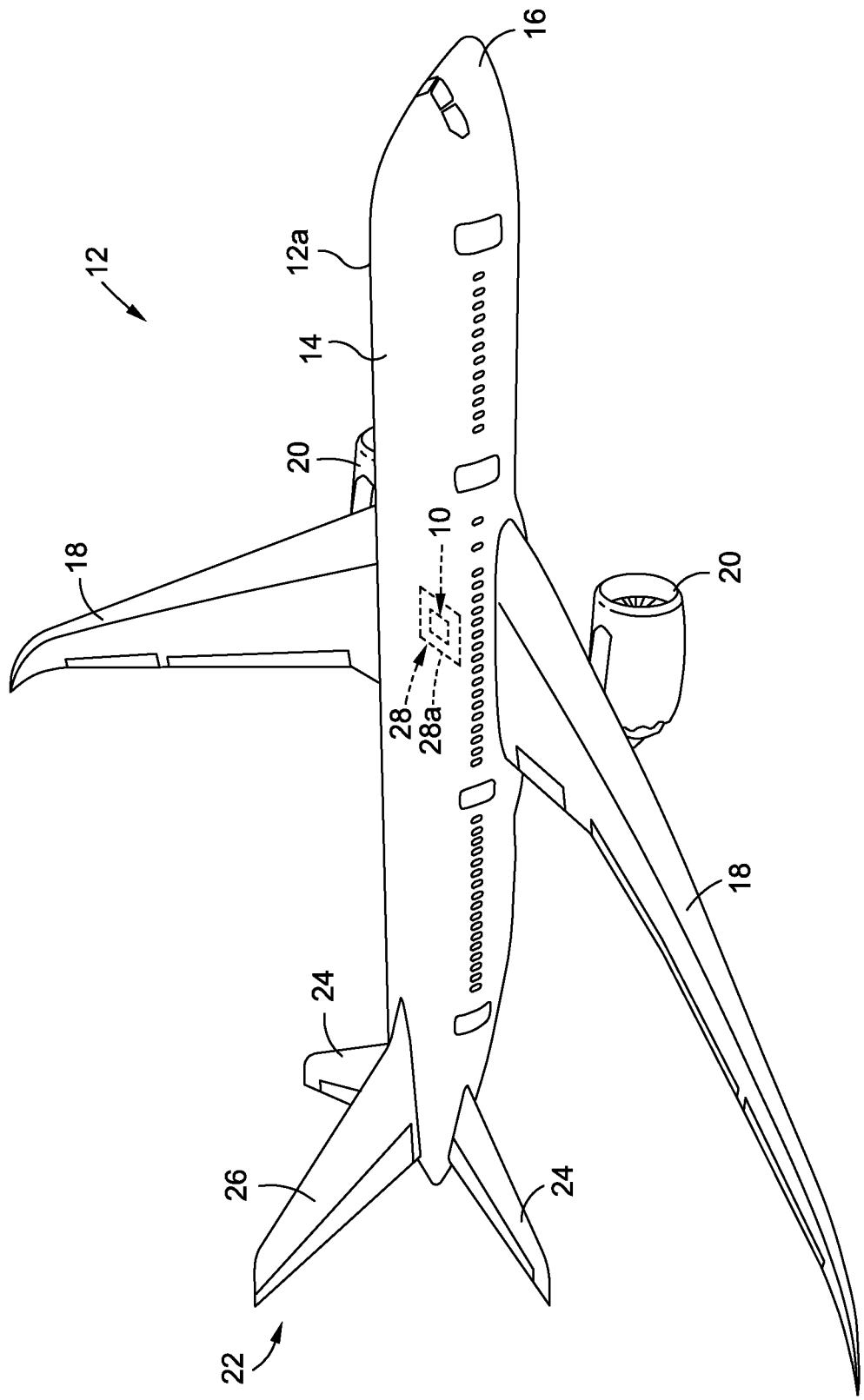
FIG. 1 is an illustration of a perspective view of an air vehicle that incorporates one or more embodiments of a decorative laminate of the disclosure.

Now referring to the Figures, FIG. 1 is an illustration of a perspective view of an air vehicle 12, such as in the form of aircraft 12a, that incorporates one or more embodiments of a decorative laminate 10, of the disclosure. As further shown in FIG. 1, the air vehicle 12, such as in the form of aircraft 12a, comprises a fuselage 14, a nose 16, wings 18, engines 20, and an empennage 22 comprising horizontal stabilizers 24 and a vertical stabilizer 26.

As further shown in FIG. 1, the air vehicle 12, such as in the form of aircraft 12a, comprises one or more structural components 28, such as in the form of interior structural components 28a, that may be covered with one or more decorative laminates 10, as disclosed herein. The one or more structural components 28, such as in the form of interior structural components 28a, are preferably aircraft interior structural components 28d (see FIG. 9C) that may be covered with one or more decorative laminates 10 (see FIGS. 1, 9A), for example, interior ceiling and sidewall decorative panels, cabin interior sidewall and ceiling panels, floor panels, stowage bins, lavatory and galley panels and structures, bulkhead partitions, cargo bin liners, window shades, insulation barriers, moisture barriers, composite noise panels, and other suitable aircraft interior structural components 28d (see FIG. 9C).

In an exemplary embodiment, the structural component 28 (see FIG. 1) comprises an aircraft interior structural component 28d (see FIG. 9C) in an air vehicle 12 (see FIG. 1), such as aircraft 12a (see FIG. 1). In other embodiments (not shown), the structural component 28 (see FIG. 1) may comprise a rotorcraft interior structural component 28e (see FIG. 9C) in a rotorcraft, a spacecraft interior structural component 28f (see FIG. 9C) in a spacecraft, a watercraft interior structural component 28g (see FIG. 9C) in a watercraft, an automobile interior structural component 28h (see FIG. 9C) in an automobile, a truck interior structural component 28i (see FIG. 9C) in a truck, or another suitable interior structural component 28a.

Figure 2:
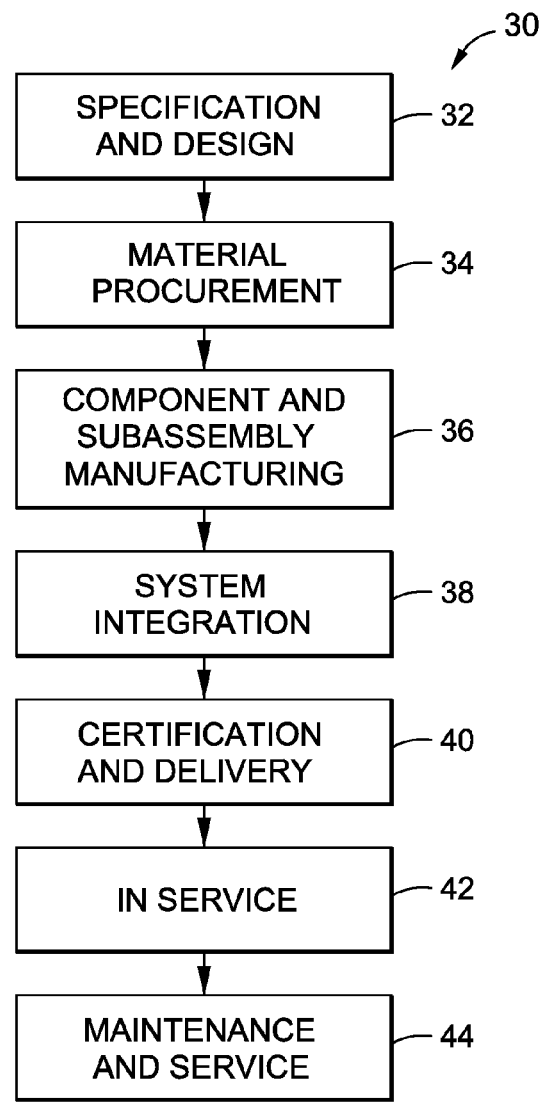
FIG. 2 is an illustration of a flow diagram of an embodiment of an aircraft manufacturing and service method.
Figure 3:
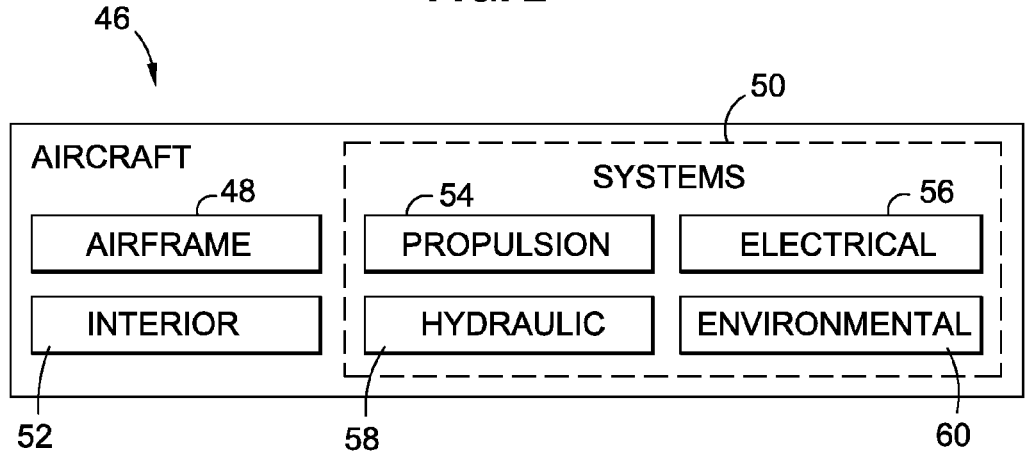
FIG. 3 is an illustration of a functional block diagram of an embodiment of an aircraft.

Referring now to FIGS. 2 and 3, FIG. 2 is an illustration of a flow diagram of an embodiment of an aircraft manufacturing and service method 30. FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 (see FIG. 2) may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4A:
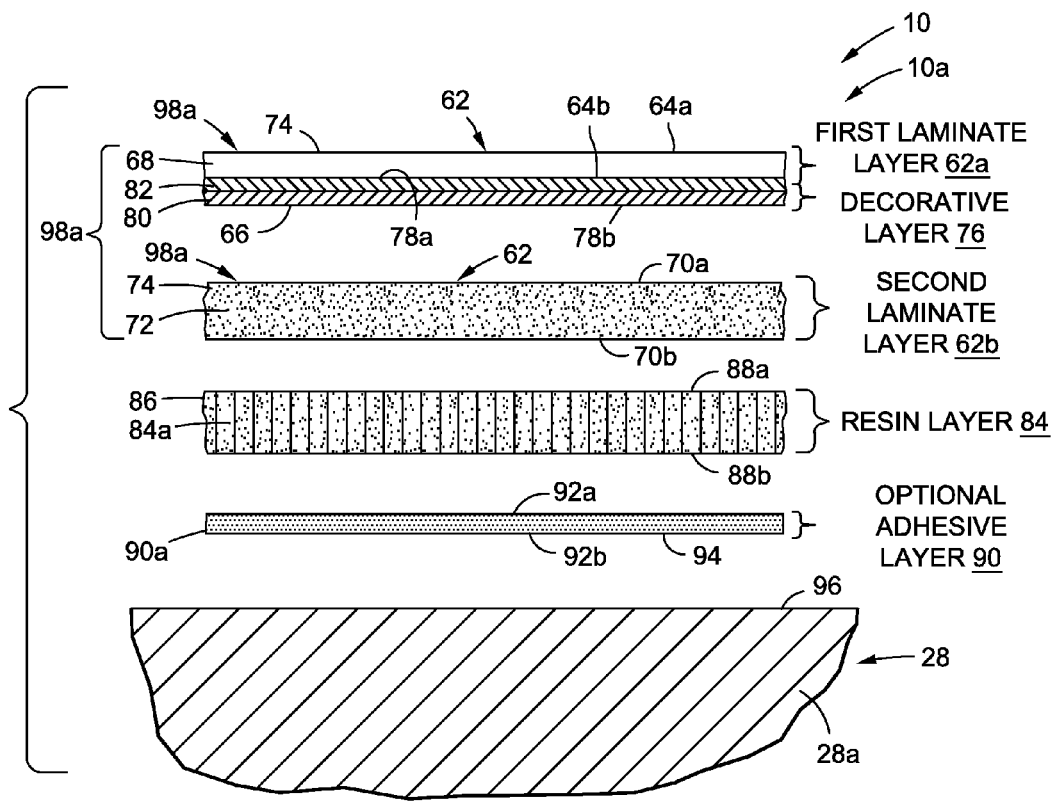
FIG. 4A is an illustration of an exploded side view of an exemplary embodiment of a decorative laminate of the disclosure.
Figure 4B:
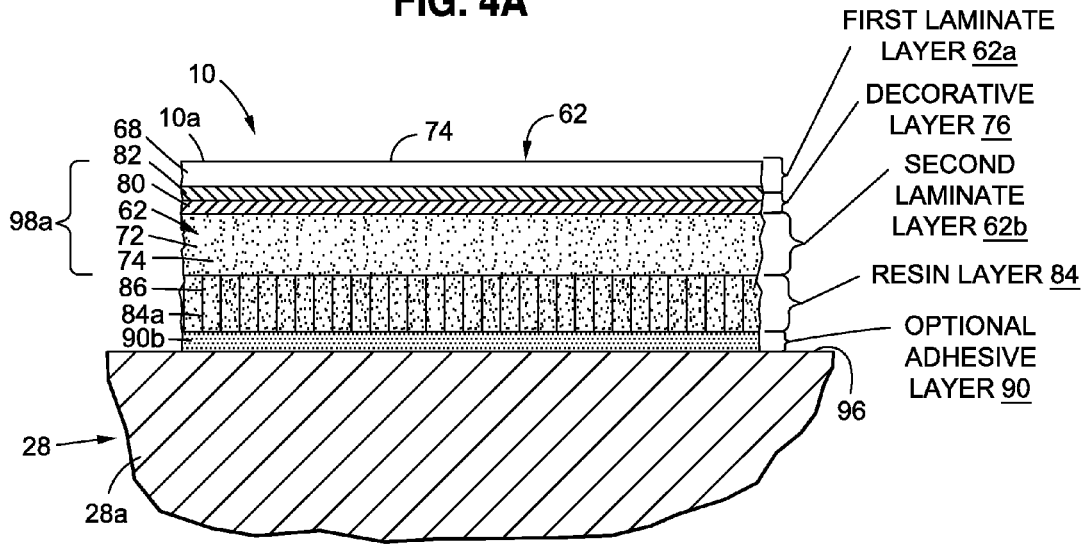
FIG. 4B is an illustration of an assembled side view of the decorative laminate of FIG. 4A.
Figure 9A:
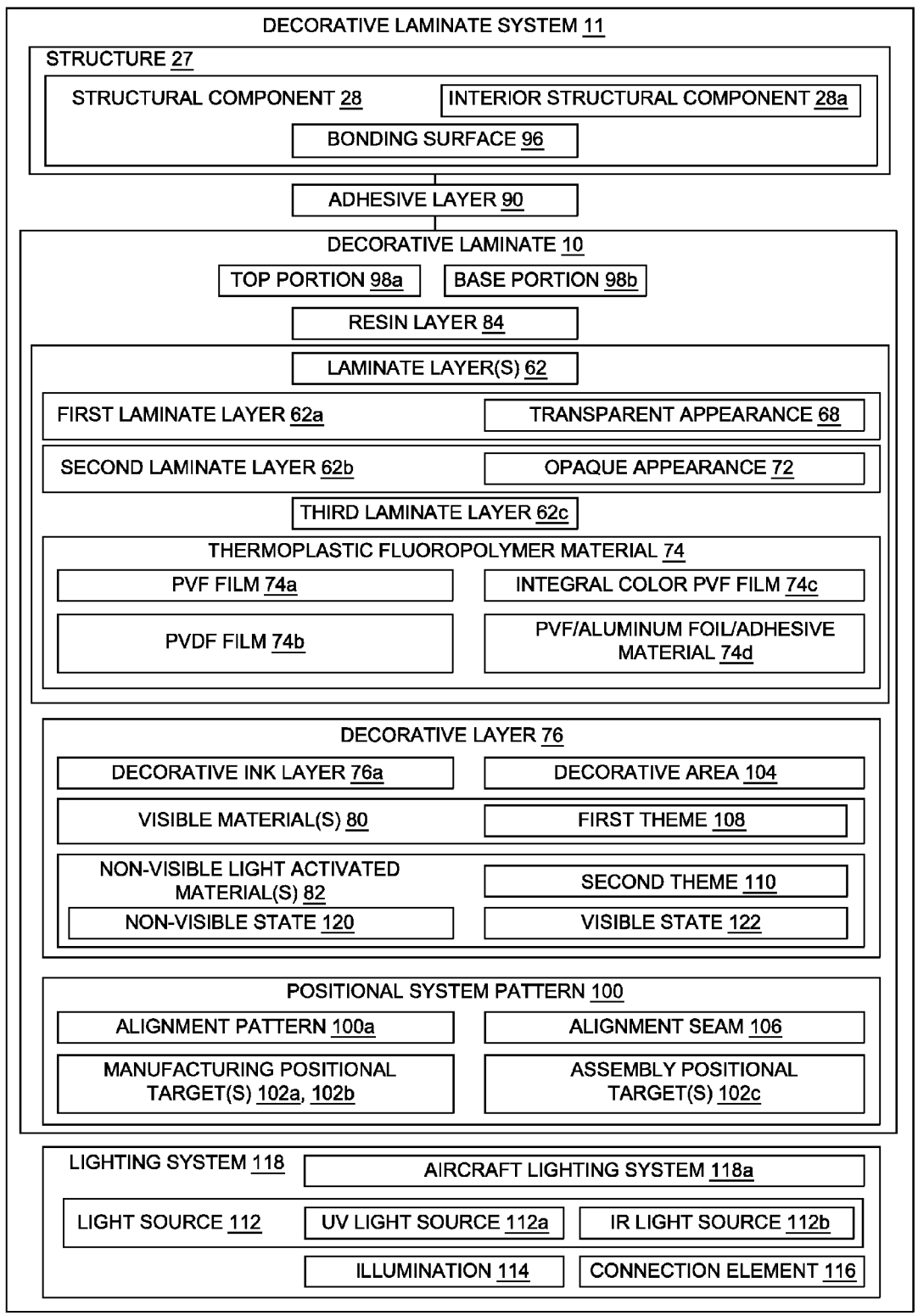
FIG. 9A is an illustration of a functional block diagram of an embodiment of a decorative laminate system of the disclosure.

In an embodiment of the disclosure, there is provided a decorative laminate 10 (see FIGS. 4A-4B, 9A). Referring now to FIGS. 4A-4B, FIG. 4A is an illustration of an exploded side view of one embodiment of the decorative laminate 10 of the disclosure, such as in the form of decorative laminate 10a. FIG. 4B is an illustration of an assembled side view of the decorative laminate 10, such as in the form of decorative laminate 10a, of FIG. 4A.

As shown in FIGS. 4A-4B, the decorative laminate 10, such as in the form of decorative laminate 10a, comprises multiple laminate layers 62, including at least a first laminate layer 62a and a second laminate layer 62b. Depending on the decorative laminate 10 (see FIGS. 5A-6B, 9A) desired to be made, one or more additional laminate layers 62 (see FIGS. 5A-6B, 9A) may be included, for example, a third laminate layer 62c (see FIGS. 5A-6B, 9A).

As further shown in FIG. 4A, the first laminate layer 62a has a first side 64a and a second side 64b. The first laminate layer 62a (see FIGS. 4A-4B) preferably has a transparent appearance 68 (see FIGS. 4A-4B, 9A) or clear appearance, in that it will transmit light through it.

The laminate layers 62 may have a thickness in a range of from about 0.25 mil to about 5.0 mils, although other suitable thicknesses may be used. Preferably, the first laminate layer 62a may have a thickness between about 1.0 mil to about 2.0 mils. Preferably, the second laminate layer 62b, and each additional laminate layer 62, may each have a thickness between about 2.0 mil to about 4.0 mils.

As further shown in FIG. 4A, the second laminate layer 62b has a first side 70a and a second side 70b. The second laminate layer 62b (see FIGS. 4A-4B) preferably has an opaque appearance 72 (see FIGS. 4A-4B, 9A) or unclear appearance, in that it will not transmit light through it.

The first laminate layer 62a (see FIGS. 4A-4B) and the second laminate layer 62b (see FIGS. 4A-4B) are each preferably comprised of a thermoplastic fluoropolymer material 74 (see FIG. 9A). The thermoplastic fluoropolymer material 74 (see FIG. 9A) preferably includes a polyvinyl fluoride (PVF) film 74a (see FIG. 9A), polyvinylidene fluoride (PVDF) film 74b (see FIG. 9A), integral color polyvinyl fluoride (PVF) film 74c (see FIG. 9A), a polyvinyl fluoride (PVF) film/aluminum foil/adhesive material 74d (see FIG. 9A), or another suitable thermoplastic fluoropolymer material 74 (see FIG. 9A).

A polyvinyl fluoride (PVF) film 74a (see FIG. 9A) that may be used is commercially available from E.I. DuPont De Nemours and Company (Wilmington, Del.) under the designation TEDLAR. (TEDLAR is a registered trademark of E.I. DuPont De Nemours and Company of Wilmington, Del.) A polyvinylidene fluoride (PVDF) film 74b (see FIG. 9A) that may be used is commercially available from Avery Dennison Corporation (Glendale, Calif.) under the designation AVIMARK. (AVIMARK is a trademark of Avery Dennison Corporation of Glendale, Calif.)

The integral color polyvinyl fluoride (PVF) film 74c (see FIG. 9A) comprises polyvinyl fluoride (PVF) film with decorative color incorporated into the PVF film. The a polyvinyl fluoride (PVF) film/aluminum foil/adhesive material 74d (see FIG. 9A) comprises a PVF film preferably having an opaque appearance 72 (see FIG. 9A) combined with 0.7 mil aluminum foil combined with an adhesive material.

Polyvinyl fluoride materials are advantageous for the laminate layers 62 (see FIGS. 4A-6B, 9A) due to their physical toughness, chemical inertness, abrasion resistance, and consistent performance regardless of temperature changes. The polyvinyl fluoride materials are also preferably able to receive a wide variety of inks used for printing graphics. As used herein, the term "thermoplastic fluoropolymer material" refers to polyvinyl fluoride-based materials including polyvinyl fluoride polymers (i.e., polymer formed from vinyl fluoride). The fluorinated polymer is generally a polymer, copolymer, or terpolymer of vinyl fluoride.

As shown in FIGS. 4A-4B, the decorative laminate 10, such as in the form of decorative laminate 10a, further comprises a decorative layer 76 disposed selectively between the first laminate layer 62a and the second laminate layer 62b. In an embodiment, the decorative layer 76 (see FIGS. 4A-4B) comprises a decorative ink layer 76a (see FIG. 9A). It will be understood by those having skill in the art that when a layer is described as being "disposed selectively between" layers or "disposed on" another layer, it may be formed directly on the layer or one or more intervening layers may be provided therebetween.

As shown in FIGS. 4A-4B, the decorative layer 76 comprises a first side 78a and a second side 78b. FIGS. 4A-4B show the first side 78a of the decorative layer 76 adjacent the second side 64b of the first laminate layer 62a, and show the second side 78b of the decorative layer 76 adjacent the first side 70a of the second laminate layer 62b. The decorative layer 76 may have a thickness in a range of from about 0.25 mil to about 5.0 mils, although other suitable thicknesses may be used.

The decorative layer 76 (see FIGS. 4A-4B, 9B) comprises one or more visible materials 80 (see FIGS. 4A-4B, 9B) disposed selectively between the first laminate layer 62a (see FIGS. 4A-4B) and the second laminate layer 62b (see FIGS. 4A-4B). The one or more visible materials 80 (see FIGS. 4A-4B, 9B) preferably comprise one or more of a visible ink jet printed ink 80a (see FIG. 9B), a visible silk screen printed ink 80b (see FIG. 9B), a visible pigment-based ink 80c (see FIG. 9B), a visible dye-based ink 80d (see FIG. 9B), a visible paint 80e (see FIG. 9B), a visible stain 80f (see FIG. 9B), a visible digital printed ink 80g (see FIG. 9B), or another suitable visible material 80 (see FIG. 9B).

The decorative layer (see FIGS. 4A-4B, 9B) further comprises one or more non-visible light activated materials 82 (see FIGS. 4A-4B, 9B) disposed selectively between the first laminate layer 62a (see FIGS. 4A-4B) and the second laminate layer 62b (see FIGS. 4A-4B). The one or more non-visible light activated materials 82 (see FIGS. 4A-4B, 9B) preferably change from a non-visible state 120 (see FIG. 9B) to a visible state 122 (see FIG. 9B) when exposed to a light source 112 (see FIG. 9A). Preferably, the light source 112 (see FIG. 9A) comprises an ultraviolet (UV) light source 112a (see FIG. 9A), an infrared (IR) light source 112b (see FIG. 9A), a light-emitting diode (LED) light source, or another suitable light source 112 (see FIG. 9A).

The one or more non-visible light activated materials 82 (see FIGS. 4A-4B, 9B) preferably comprise one or more of a non-visible ink jet printed ink 82a (see FIG. 9B), a non-visible silk screen printed ink 82b (see FIG. 9B), a non-visible pigment-based ink 82c (see FIG. 9B), a non-visible dye-based ink 82d (see FIG. 9B), a non-visible paint 82e (see FIG. 9B), a non-visible stain 82f (see FIG. 9B), a non-visible digital printed ink 82g (see FIG. 9B), or another suitable non-visible light activated material 82 (see FIGS. 4A-4B, 9B), each configured to change from the non-visible state 120 (see FIG. 9B) to the visible state 122 (see FIG. 9B), when exposed to the light source 112 (see FIG. 9A). For example, the non-visible light activated materials 82 (see FIGS. 4A-4B, 9B) may comprise light activated or light sensitive materials, such as ultraviolet light sensitive non-visible or invisible inks. Ultraviolet light sensitive non-visible or invisible inks are a class of inks which are non-visible or invisible to the naked eye, but become highly visible under ultraviolet light.

The decorative layer 76 (see FIGS. 4A-4B) is preferably deposited or applied between the first laminate layer 62a (see FIGS. 4A-4B) and the second laminate layer 62b (see FIGS. 4A-4B). More preferably, the decorative layer 76 (see FIG. 4A) is printed on the second side 64b (see FIG. 4A) of the first laminate layer 62a (see FIG. 4A) to form a printed decorative material side 66 (see FIG. 4A).

Figure 9B:
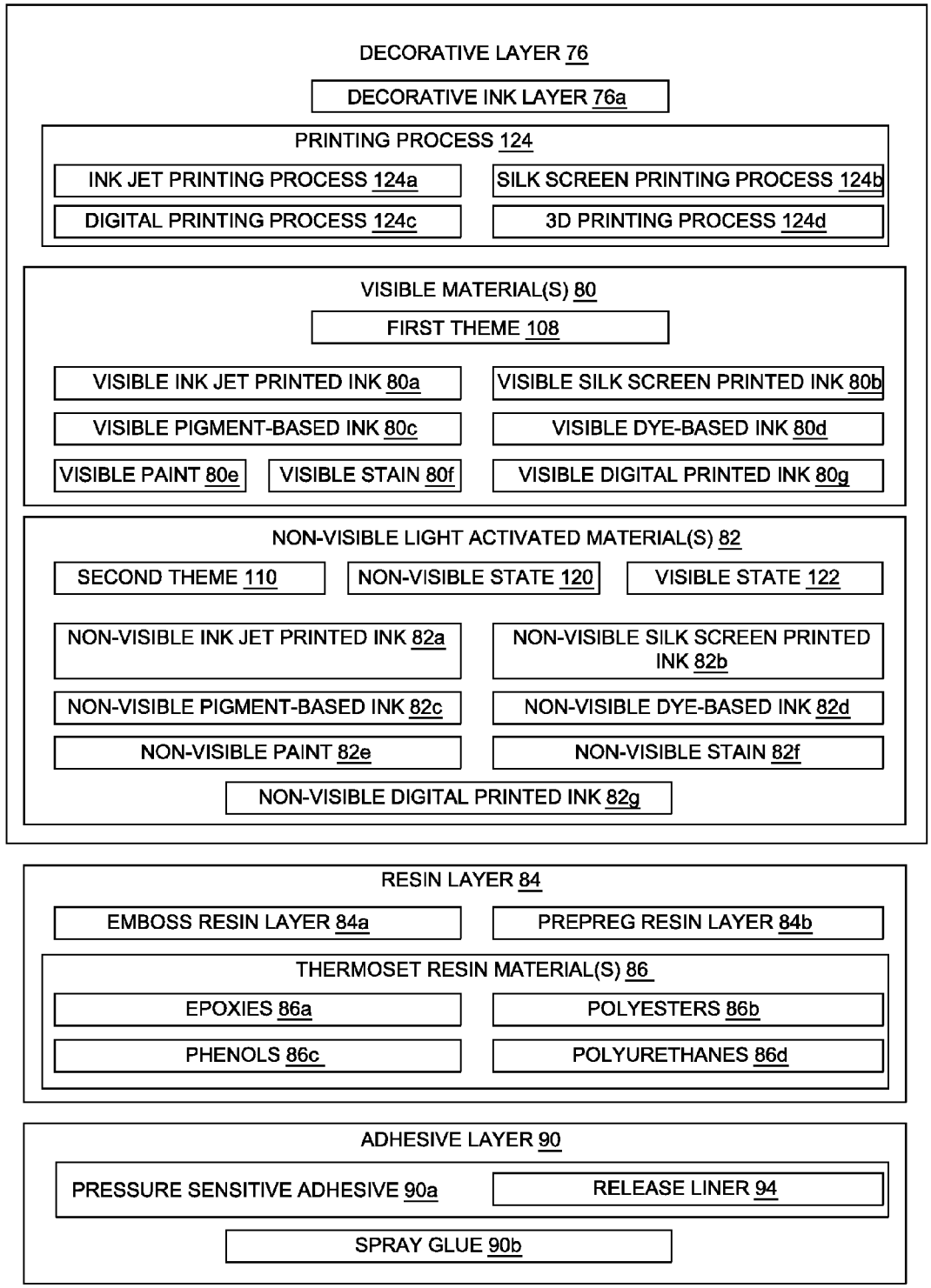
FIG. 9B is an illustration of a functional block diagram of embodiments of a decorative layer, a resin layer and an adhesive layer of the decorative laminate system of FIG. 9A.

The decorative layer 76 (see FIGS. 4A-4B) is preferably deposited between the first laminate layer 62a (see FIGS. 4A-4B) and the second laminate layer 62b (see FIGS. 4A-4B) or printed onto the first laminate layer 62a (see FIG. 4A) via a printing process 124 (see FIG. 9B). The printing process 124 (see FIG. 9B) preferably comprises an ink jet printing process 124a (see FIG. 9B), a silkscreen printing process 124b (see FIG. 9B), a digital printing process 124c (see FIG. 9B), a three-dimensional (3D) printing process 124d (see FIG. 9B), or another suitable printing process 124 (see FIG. 9B).

As shown in FIGS. 4A-4B, the decorative laminate 10, such as in the form of decorative laminate 10a, further comprises a resin layer 84 disposed on the second laminate layer 62b. As further shown in FIG. 4A, the resin layer 84 has a first side 88a and a second side 88b. FIGS. 4A-4B show the first side 88a of the resin layer 84 adjacent the second side 70b of the second laminate layer 62b. The resin layer 84 may preferably have a thickness in a range of from about 0.25 mil to about 5.0 mils, although other suitable thicknesses may be used.

The resin layer 84 (see FIGS. 4A-4B) preferably comprises an emboss resin layer 84a (see FIGS. 4A-4B), a prepreg resin layer 84b (see FIGS. 6A-6B), or another suitable resin material layer. The resin material of the resin layer 84 (see FIGS. 4A-4B) is preferably a texture retention material that forms to an introduced texture when processed, and that maintains that texture after curing. The emboss resin layer 84a (see FIGS. 4A-4B, 9B) preferably comprises one or more thermoset resin materials 86 (see FIG. 9B) consisting of epoxies 86a (see FIG. 9B), polyesters 86b (see FIG. 9B), phenols 86c (see FIG. 9B), polyurethanes 86d (see FIG. 9B), and a combination thereof. The thermoset resin material 86 (see FIG. 9B) provides texture support, retention, and adhesion for the laminate layer(s) 62 (see FIGS. 4A-6B) adjacent the thermoset resin material 86 (see FIG. 9B) of the resin layer 84 (see FIGS. 4A-6B), and in particular, for the polyvinyl fluoride (PVF) films 74a (see FIG. 9A). The emboss resin layer 84a (see FIGS. 4A, 9B) is preferably a pigmented embossable resin, such as the thermoset resin material 86 (see FIGS. 4A, 9B), which may be embossed to provide texture to the decorative laminate 10 (see FIGS. 4A-6B), and which may be colored to match the color or the predominant color of the image or design printed upon the first laminate layer 62a or another laminate layer 62 (see FIGS. 4A-6B, 9A).

As shown in FIGS. 4A-4B, the decorative laminate 10, such as in the form of decorative laminate 10a, may further comprise an optional adhesive layer 90 disposed between the decorative laminate 10 and a bonding surface 96 of the structural component 28, such as in the form of interior structural component 28a. As shown in FIG. 4A, the adhesive layer 90 comprises a first side 92a and a second side 92b. FIGS. 4A-4B show the first side 92a of the adhesive layer 90 adjacent the second side 88b of the resin layer 84, and shows the second side 92b of the adhesive layer 90 adjacent the bonding surface 96. The adhesive layer 90 may preferably have a thickness in a range of from about 0.25 mil to about 5.0 mils, although other suitable thicknesses may be used.

In one embodiment, the adhesive layer 90 (see FIGS. 4A-4B) may comprise a pressure sensitive adhesive 90a (see FIGS. 4A-4B) that may be applied or integrated with the decorative laminate 10 (see FIGS. 4A-4B). The pressure sensitive adhesive 90a (see FIG. 4A) preferably has a release liner 94 (see FIG. 4A) that may be removed and discarded when the decorative laminate 10 (see FIG. 4A) is applied to the structural component 28 (see FIG. 4A).

In another embodiment, the adhesive layer 90 (see FIGS. 5A-6B) may comprise a spray glue 90b (see FIGS. 5A-6B), or other suitable spray or liquid adhesive material. The spray glue 90b (FIGS. 5A-6B) may be applied to the bonding surface 96 (see FIGS. 5A-6B) of the structural component 28 (see FIGS. 5A-6B), when the decorative laminate 10 (see FIGS. 5A-6B) is applied to the structural component 28 (see FIGS. 5A-6B).

As shown in FIGS. 4A-4B, the first laminate layer 62a, the decorative layer 76, and the second laminate layer 62b preferably together comprise a top portion 98a or a top sheet. The top portion 98a (see FIGS. 4A-4B), together with the resin layer 84 (see FIGS. 4A-4B), forms a decorative laminate 10, such as in the form of decorative laminate 10a, that is preferably flexible and that may be easily formed around corners, contours, or curved portions of a structure 27 (see FIG. 9A), such as a structural component 28 (see FIG. 9A).

As shown in FIGS. 4A-4B, the first laminate layer 62a, the decorative layer 76, the second laminate layer 62b, and the resin layer 84 are preferably sequentially layered and laminated together to form the decorative laminate 10, such as in the form of decorative laminate 10a, configured for application to the structural component 28. The structural component 28, such as interior structural component 28a, has the bonding surface 96.

Figure 5A:
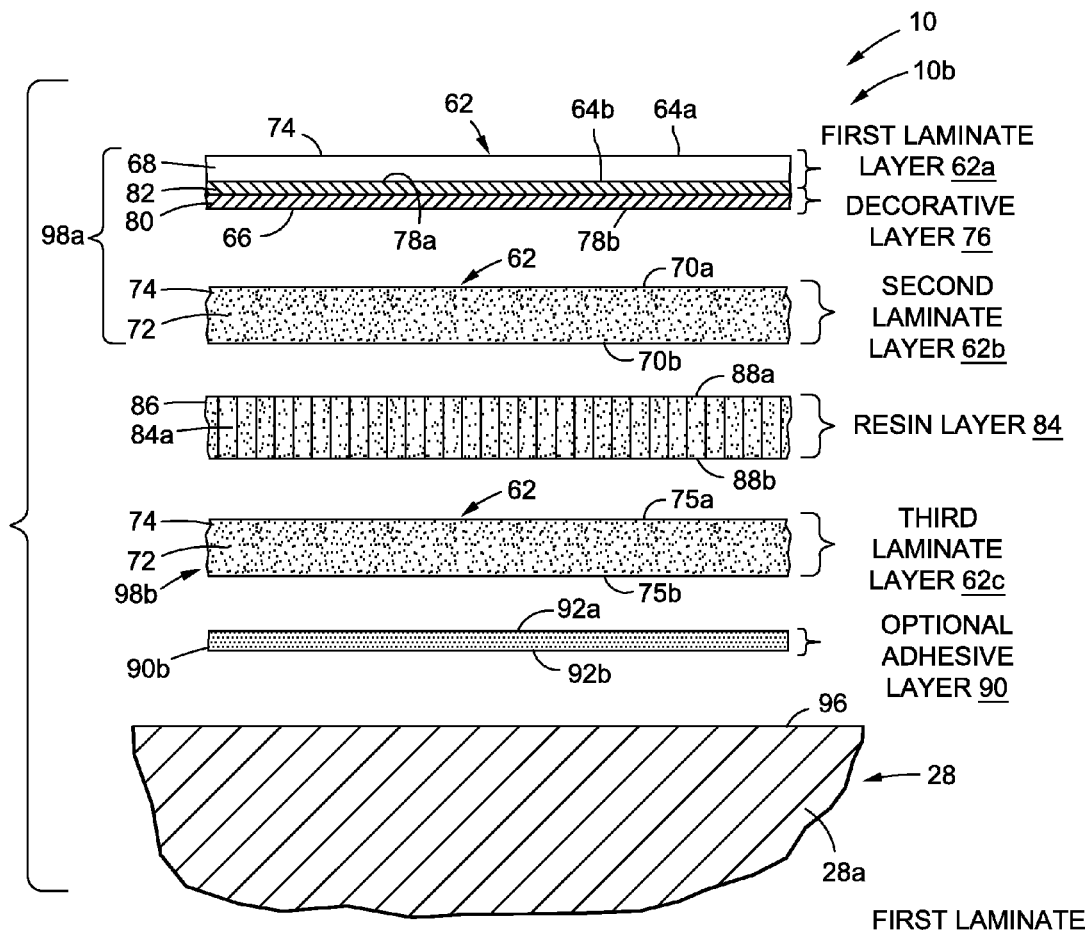
FIG. 5A is an illustration of an exploded side view of another exemplary embodiment of a decorative laminate of the disclosure.
Figure 5B:
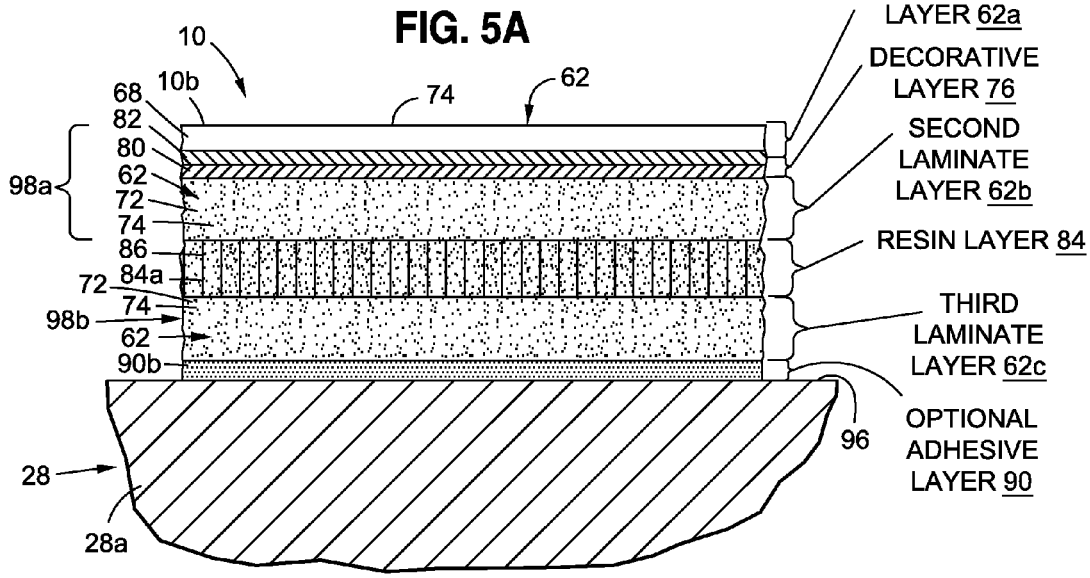
FIG. 5B is an illustration of an assembled side view of the decorative laminate of FIG. 5A.

Referring now to FIGS. 5A-5B, FIG. 5A is an illustration of an exploded side view of another exemplary embodiment of a decorative laminate 10, such as in the form of decorative laminate 10b, of the disclosure. FIG. 5B is an illustration of an assembled side view of the decorative laminate 10, such as in the form of decorative laminate 10b, of FIG. 5A.

In this embodiment, as shown in FIGS. 5A-5B, the decorative laminate 10, such as in the form of decorative laminate 10b, includes the top portion 98a comprised of the first laminate layer 62a, the decorative layer 76, and the second laminate layer 62b, and also includes a base portion 98b, or base layer, comprised of a third laminate layer 62c. The decorative laminate 10 (see FIGS. 5A-5B), such as in the form of decorative laminate 10b (see FIGS. 5A-5B), also includes a resin layer 84 (see FIGS. 5A-5B) disposed between the second laminate layer 62b (see FIGS. 5A-5B) and the third laminate layer 62c (see FIGS. 5A-5B). The presence of the base portion 98b (see FIGS. 5A-5B) may create a more rigid decorative laminate 10 (see FIGS. 5A-5B) that is beneficial for application to flat or substantially flat surfaces.

As shown in FIGS. 5A-5B, the decorative laminate 10 comprises one additional laminate layer 62, in the form of third laminate layer 62c. As shown in FIG. 5A, the third laminate layer 62c comprises a first side 75a and a second side 75b. As further shown in FIGS. 5A-5B, the first side 75a of the third laminate layer 62c is adjacent the second side 88b of the resin layer 84, and the second side 75b of the third laminate layer 62c is adjacent the first side 92a of the adhesive layer 90, when the adhesive layer 90 is included. The third laminate layer 62c (see FIGS. 5A-5B), as well as the second laminate layer 62b (see FIGS. 5A-5B) preferably each have an opaque appearance 72 (see FIGS. 5A-5B, 9A) or unclear appearance, in that they will not transmit light through them.

As further shown in FIG. 5A, the first laminate layer 62a has a first side 64a, a second side 64b, and a transparent appearance 68, or clear appearance, in that it will transmit light through it. The second laminate layer 62b (see FIG. 5A) has a first side 70a (see FIG. 5A) and a second side 70b (see FIG. 5A).

The first laminate layer 62a (see FIGS. 5A-5B), the second laminate layer 62b (see FIGS. 5A-5B), and the third laminate layer 62c (see FIGS. 5A-5B) are each preferably comprised of a thermoplastic fluoropolymer material 74 (see FIG. 9A). As discussed above, the thermoplastic fluoropolymer material 74 (see FIG. 9A) preferably includes polyvinyl fluoride (PVF) film 74a (see FIG. 9A), polyvinylidene fluoride (PVDF) film 74b (see FIG. 9A), integral color polyvinyl fluoride (PVF) film 74c (see FIG. 9A), polyvinyl fluoride (PVF) film/aluminum foil/adhesive material 74d (see FIG. 9A), or another suitable thermoplastic fluoropolymer material 74 (see FIG. 9A).

As shown in FIGS. 5A-5B, the decorative laminate 10, such as in the form of decorative laminate 10b, further comprises the decorative layer 76 disposed selectively between the first laminate layer 62a and the second laminate layer 62b. As shown in FIGS. 5A-5B, the decorative layer 76 comprises a first side 78a and a second side 78b, with the first side 78a of the decorative layer 76 adjacent the second side 64b of the first laminate layer 62a, and the second side 78b of the decorative layer 76 adjacent the first side 70a of the second laminate layer 62b.

The decorative layer 76 (see FIGS. 5A-5B) comprises one or more visible materials 80 (see FIGS. 5A-5B), discussed in detail above, and disposed selectively between the first laminate layer 62a (see FIGS. 5A-5B) and the second laminate layer 62b (see FIGS. 5A-5B). The decorative layer (see FIGS. 5A-5B) further comprises one or more non-visible light activated materials 82 (see FIGS. 5A-5B), discussed in detail above, and disposed selectively between the first laminate layer 62a (see FIGS. 5A-5B) and the second laminate layer 62b (see FIGS. 5A-5B). The one or more non-visible light activated materials 82 (see FIGS. 5A-5B) preferably change from the non-visible state 120 (see FIG. 9B) to the visible state 122 (see FIG. 9B), when exposed to the light source 112 (see FIG. 9A), such as the ultraviolet (UV) light source 112a (see FIG. 9A), the infrared (IR) light source 112b (see FIG. 9A), or another suitable light source 112 (see FIG. 9A).

The decorative layer 76 (see FIGS. 5A-5B) is preferably deposited or applied between the first laminate layer 62a (see FIGS. 5A-5B) and the second laminate layer 62b (see FIGS. 5A-5B). More preferably, the decorative layer 76 (see FIG. 5A) is printed on the second side 64b (see FIG. 5A) of the first laminate layer 62a (see FIG. 5A) to form the printed decorative material side 66 (see FIG. 5A).

The decorative layer 76 (see FIGS. 5A-5B) is preferably deposited between the first laminate layer 62a (see FIGS. 5A-5B) and the second laminate layer 62b (see FIGS. 5A-5B) or printed onto the first laminate layer 62a (see FIG. 5A) via a printing process 124 (see FIG. 9B), as discussed above.

As shown in FIGS. 5A-5B, the decorative laminate 10, such as in the form of decorative laminate 10b, further comprises a resin layer 84 disposed on the second laminate layer 62b. As further shown in FIG. 5A, the resin layer 84 has the first side 88a and the second side 88b. FIGS. 5A-5B show the first side 88a of the resin layer 84 adjacent the second side 70b of the second laminate layer 62b, and the second side 88b of the resin layer 84 adjacent the first side 75a of the third laminate layer 62c.

The resin layer 84 (see FIGS. 5A-5B) preferably comprises an emboss resin layer 84a (see FIGS. 5A-5B), a prepreg resin layer 84b (see FIGS. 6A-6B), or another suitable resin material layer. The emboss resin layer 84a (see FIGS. 5A-5B, 9B) preferably comprises one or more thermoset resin materials 86 (see FIG. 9B), discussed in detail above.

As shown in FIGS. 5A-5B, the decorative laminate 10, such as in the form of decorative laminate 10b, may further comprise the optional adhesive layer 90 disposed between the third laminate layer 62c and the bonding surface 96 of the structural component 28, such as in the form of interior structural component 28a. As shown in FIG. 5A, the adhesive layer 90 comprises the first side 92a and the second side 92b. FIGS. 5A-5B show the first side 92a of the adhesive layer 90 adjacent the second side 75b of the third laminate layer 62c, and shows the second side 92b of the adhesive layer 90 adjacent the bonding surface 96. As shown in FIGS. 5A-5B, the adhesive layer 90 comprises a spray glue layer 90b. However, other suitable spray or liquid adhesive materials may be used. Alternatively, the adhesive layer 90 (see FIGS. 4A-4B) may comprise a pressure sensitive adhesive 90a (see FIGS. 4A-4B) that may be applied or integrated with the decorative laminate 10 (see FIGS. 4A-4B).

As shown in FIGS. 5A-5B, the first laminate layer 62a, the decorative layer 76, and the second laminate layer 62b preferably together comprise the top portion 98a, or top sheet, and the third laminate layer 62c comprises the base portion 98b, or base layer. The top portion 98a (see FIGS. 5A-5B), together with the resin layer 84 (see FIGS. 5A-5B), and the base portion 98b (see FIGS. 5A-5B) form the decorative laminate 10 (see FIGS. 5A-5B), such as in the form of decorative laminate 10b (see FIGS. 5A-5B).

As shown in FIGS. 5A-5B, the first laminate layer 62a, the decorative layer 76, the second laminate layer 62b, the resin layer 84, and the third laminate layer 62c, are preferably sequentially layered and laminated together to form the decorative laminate 10, such as in the form of decorative laminate 10b, configured for application to the structural component 28. The structural component 28, such as interior structural component 28a, has the bonding surface 96.

Figure 6A:
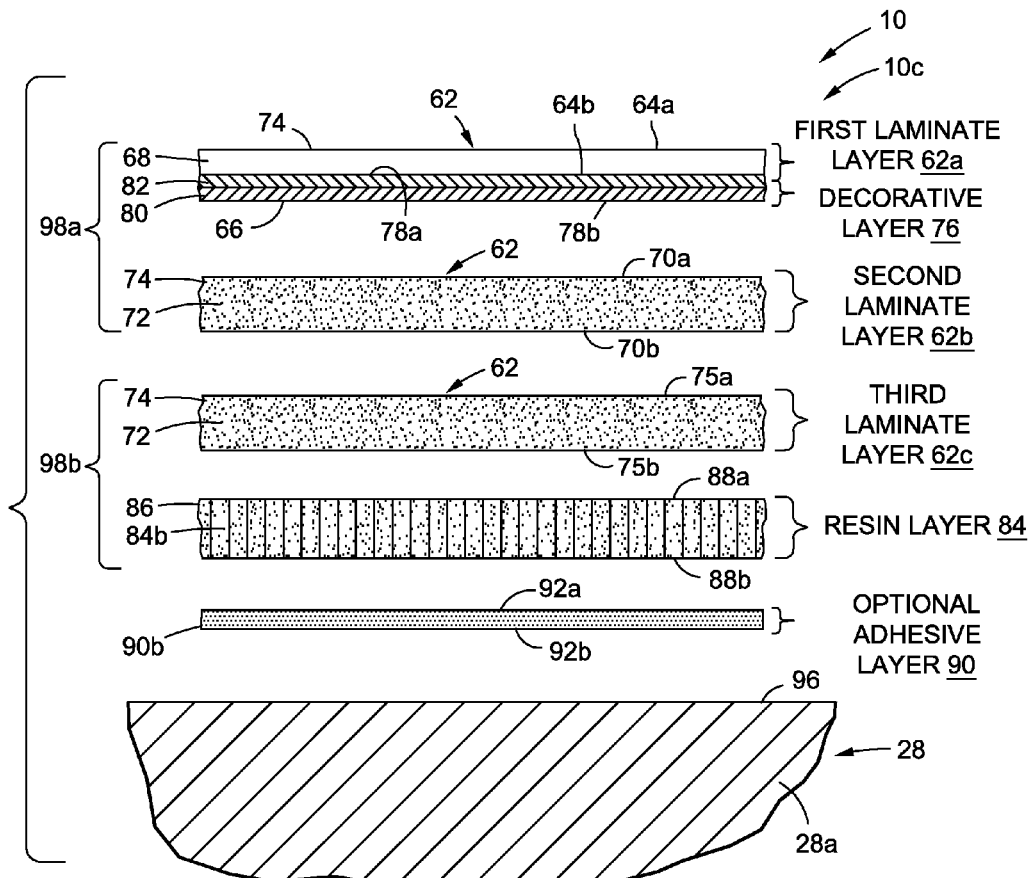
FIG. 6A is an illustration of an exploded side view of yet another exemplary embodiment of a decorative laminate of the disclosure.
Figure 6B:
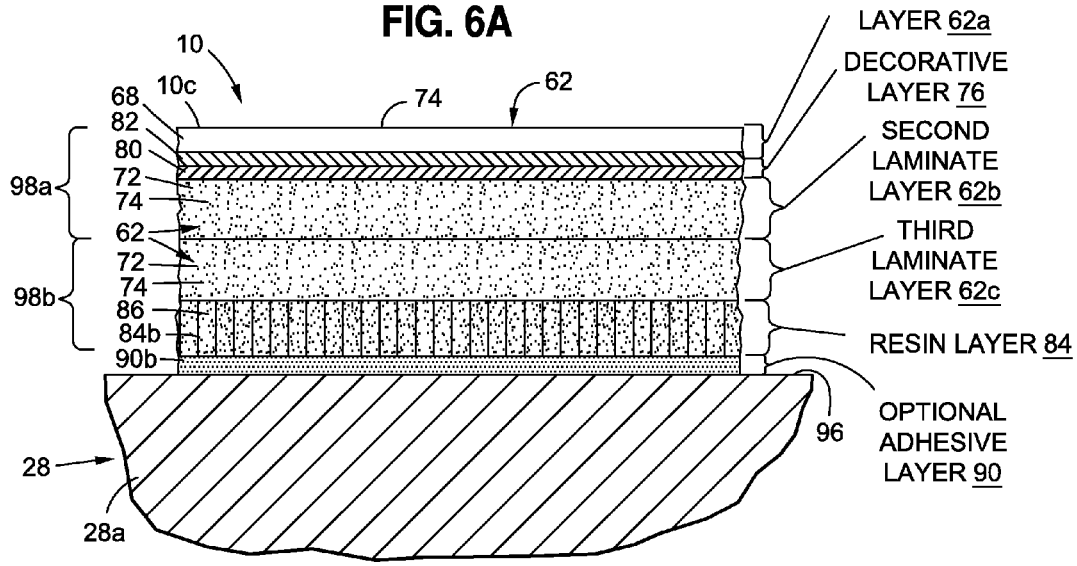
FIG. 6B is an illustration of an assembled side view of the decorative laminate of FIG. 6A.

Referring now to FIGS. 6A-6B, FIG. 6A is an illustration of an exploded side view of yet another exemplary embodiment of a decorative laminate 10, such as in the form of decorative laminate 10c, of the disclosure. FIG. 6B is an illustration of an assembled side view of the decorative laminate 10, such as in the form of decorative laminate 10c, of FIG. 6A.

In this embodiment, as shown in FIGS. 6A-6B, the third laminate layer 62c and the resin layer 84 of the decorative laminate 10c are in a reverse order, as compared to the decorative laminate 10b of FIGS. 5A-5B. As shown in FIGS. 6A-6B, the decorative laminate 10, such as in the form of decorative laminate 10c, includes the top portion 98a, or top sheet, comprised of the first laminate layer 62a, the decorative layer 76, and the second laminate layer 62b, and includes the base portion 98b, or base layer, comprised of the third laminate layer 62c and the resin layer 84.

As further shown in FIGS. 6A-6B, the decorative laminate 10, such as in the form of decorative laminate 10c, has the third laminate layer 62c disposed between the second laminate layer 62b and the resin layer 84. Again, as with the decorative laminate 10 in FIGS. 5A-5B, the presence of the base portion 98b (see FIGS. 6A-6B) may create a more rigid decorative laminate 10 (see FIGS. 6A-6B) that is beneficial for application to flat or substantially flat surfaces.

As shown in FIGS. 6A-6B, the decorative laminate 10 comprises one additional laminate layer 62, in the form of third laminate layer 62c. As shown in FIG. 6A, the third laminate layer 62c comprises the first side 75a and the second side 75b. As further shown in FIGS. 6A-6B, the first side 75a of the third laminate layer 62c is adjacent the second side 70b of the second laminate layer 62b, and the second side 75b of the third laminate layer 62c is adjacent the first side 88a of the resin layer 84. The third laminate layer 62c (see FIGS. 6A-6B), as well as the second laminate layer 62b (see FIGS. 6A-6B) preferably each have the opaque appearance 72 (see FIGS. 6A-6B, 9A) or unclear appearance, in that they will not transmit light through them.

As further shown in FIG. 6A, the first laminate layer 62a has the first side 64a, the second side 64b, and the transparent appearance 68, or clear appearance, in that it will transmit light through it. The second laminate layer 62b (see FIG. 6A) has the first side 70a (see FIG. 6A) and a second side 70b (see FIG. 6A).

As discussed above with respect to the decorative laminate 10b of FIGS. 5A-5B, similarly with the decorative laminate 10c of FIGS. 6A-6B, the first laminate layer 62a, the second laminate layer 62b, and the third laminate layer 62c are each preferably comprised of the thermoplastic fluoropolymer material 74 (see FIG. 9A).

As shown in FIGS. 6A-6B, the decorative laminate 10, such as in the form of decorative laminate 10c, further comprises the decorative layer 76 disposed selectively between the first laminate layer 62a and the second laminate layer 62b. As shown in FIGS. 6A-6B, the decorative layer 76 comprises the first side 78a and the second side 78b, with the first side 78a of the decorative layer 76 adjacent the second side 64b of the first laminate layer 62a, and the second side 78b of the decorative layer 76 adjacent the first side 70a of the second laminate layer 62b.

The decorative layer 76 (see FIGS. 6A-6B) comprises one or more visible materials 80 (see FIGS. 6A-6B), discussed in detail above, and disposed selectively between the first laminate layer 62a (see FIGS. 6A-6B) and the second laminate layer 62b (see FIGS. 6A-6B). The decorative layer (see FIGS. 6A-6B) further comprises one or more non-visible light activated materials 82 (see FIGS. 6A-6B), discussed in detail above, and disposed selectively between the first laminate layer 62a (see FIGS. 6A-6B) and the second laminate layer 62b (see FIGS. 6A-6B). The one or more non-visible light activated materials 82 (see FIGS.

6A-6B) preferably change from the non-visible state 120 (see FIG. 9B) to the visible state 122 (see FIG. 9B), when exposed to the light source 112 (see FIG. 9A), such as the ultraviolet (UV) light source 112*a* (see FIG. 9A), the infrared (IR) light source 112*b* (see FIG. 9A), the light-emitting diode (LED) light source, or another suitable light source 112 (see FIG. 9A).

The decorative layer 76 (see FIGS. 6A-6B) is preferably deposited or applied between the first laminate layer 62*a* (see FIGS. 6A-6B) and the second laminate layer 62*b* (see FIGS. 6A-6B). More preferably, the decorative layer 76 (see FIG. 6A) is printed on the second side 64*b* (see FIG. 6A) of the first laminate layer 62*a* (see FIG. 6A) to form the printed decorative material side 66 (see FIG. 6A).

The decorative layer 76 (see FIGS. 6A-6B) is preferably deposited between the first laminate layer 62*a* (see FIGS. 6A-6B) and the second laminate layer 62*b* (see FIGS. 6A-6B) or printed onto the first laminate layer 62*a* (see FIG. 6A) via a printing process 124 (see FIG. 9B), as discussed above.

As shown in FIGS. 6A-6B, the decorative laminate 10, such as in the form of decorative laminate 10*c*, further comprises the resin layer 84 disposed on the third laminate layer 62*c*. As further shown in FIG. 6A, the resin layer 84 has the first side 88*a* and the second side 88*b*. FIGS. 6A-6B show the first side 88*a* of the resin layer 84 adjacent the second side 75*b* of the third laminate layer 62*c*, and the second side 88*b* of the resin layer 84 adjacent the first side 92*a* of the adhesive layer 90. As shown in FIGS. 6A-6B, the resin layer 84 comprises the prepreg resin layer 84*b*.

As further shown in FIGS. 6A-6B, the decorative laminate 10, such as in the form of decorative laminate 10*c*, may further comprise the optional adhesive layer 90 disposed between resin layer 84 and the bonding surface 96 of the structural component 28, such as in the form of interior structural component 28*a*. As shown in FIG. 6A, the adhesive layer 90 comprises the first side 92*a* and the second side 92*b*. FIGS. 6A-6B show the first side 92*a* of the adhesive layer 90 adjacent the second side 88*b* of the resin layer 84, and shows the second side 92*b* of the adhesive layer 90 adjacent the bonding surface 96. As shown in FIGS. 6A-6B, the adhesive layer 90 comprises a spray glue layer 90*b*. However, other suitable spray or liquid adhesive materials may be used. Alternatively, the adhesive layer 90 (see FIGS. 4A-4B) may comprise a pressure sensitive adhesive 90*a* (see FIGS. 4A-4B) that may be applied or integrated with the decorative laminate 10 (see FIGS. 4A-4B).

As shown in FIGS. 6A-6B, the first laminate layer 62*a*, the decorative layer 76, and the second laminate layer 62*b* preferably together comprise the top portion 98*a* or top sheet, and the third laminate layer 62*c* and the resin layer 84 comprise the base portion 98*b*. The top portion 98*a* (see FIGS. 6A-6B), together with the resin layer 84 (see FIGS. 6A-6B), and the base portion 98*b* (see FIGS. 6A-6B) form the decorative laminate 10 (see FIGS. 6A-6B), such as in the form of decorative laminate 10*c* (see FIGS. 6A-6B).

As shown in FIGS. 6A-6B, the first laminate layer 62*a*, the decorative layer 76, the second laminate layer 62*b*, the third laminate layer 62*c*, and the resin layer 84 are preferably sequentially layered and laminated together to form the decorative laminate 10, such as in the form of decorative laminate 10*c*, configured for application to the structural component 28. The structural component 28, such as interior structural component 28*a*, has the bonding surface 96.

Figure 7:
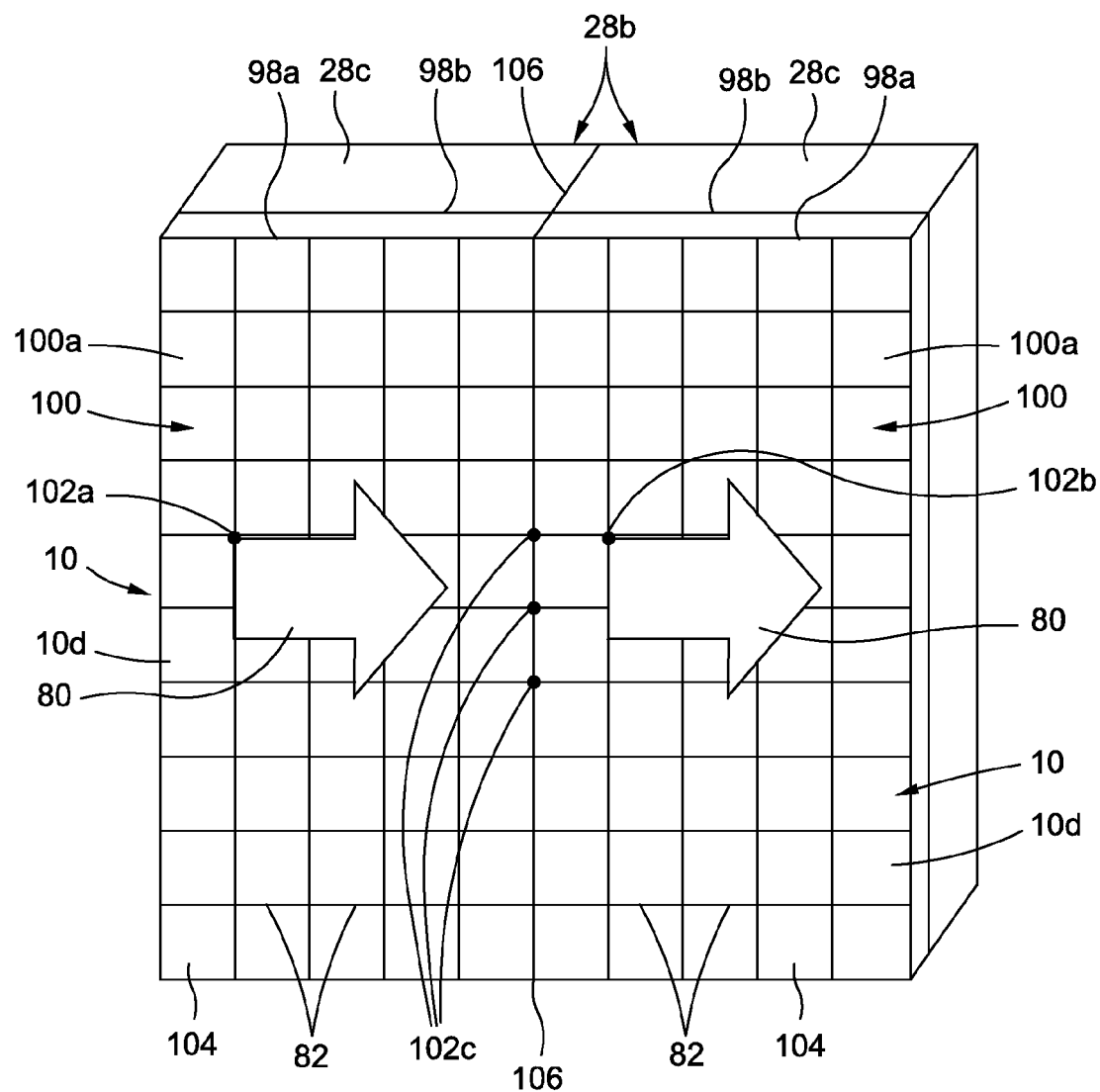
FIG. 7 is an illustration of a front perspective view of assembled structural composite panels, each having an embodiment of a decorative laminate with a positional system pattern.

Referring now to FIG. 7, FIG. 7 is an illustration of a front perspective view of assembled structural composite panels 28*b*, such as cured structural composite panels 28*c*, each with an embodiment of a decorative laminate 10, such as in the form of decorative laminate 10*d*, having a positional system pattern 100. Each decorative laminate 10 (see FIG. 7), such as in the form of decorative laminate 10*d* (see FIG. 7), has a top portion 98*a* (see FIG. 7) and a base portion 98*b* (see FIG. 7).

As further shown in FIG. 7, each decorative laminate 10, such as in the form of decorative laminate 10*d*, comprises visible material 80, e.g., in the form of arrow images, and comprises non-visible light activated material 82 in the form of the positional system pattern 100. As further shown in FIG. 7, the non-visible light activated material 82 forms the positional system pattern 100, such as an alignment pattern 100*a*, on a decorative area 104 of each decorative laminate 10. The non-visible light activated material 82 (see FIG. 7) may be deposited or printed on the decorative laminate 10 (see FIG. 7) in the alignment pattern 100*a* (see FIG. 7) to facilitate alignment and positioning of the decorative laminate 10 (see FIG. 7), when applied to a structural component 28 (see FIG. 9A), such as structural composite panels 28*b* (see FIG. 7).

As further shown in FIG. 7, non-decorative information or markings, such as manufacturing positional targets 102*a*, 102*b*, comprised of non-visible light activated material 82 may be included on the positional system pattern 100 of each decorative laminate 10, such as in the form of decorative laminate 10*d*. When illuminated with a light source 112 (see FIGS. 8B, 9A), such as an ultraviolet (UV) light source 112*a* (see FIG. 9A), an infrared (IR) light source 112*b* (see FIG. 9A), or another suitable light source, the manufacturing positional targets 102*a*, 102*b* (see FIG. 7) may provide manufacturers, manufacturing-related users, or other users, with visible target reference points for positioning and aligning the decorative laminate 10 (see FIG. 7) on the structural composite panel 28*b* (see FIG. 7). In addition, the manufacturing positional targets 102*a*, 102*b* (see FIG. 7) remain intact and do not get trimmed off of the final manufactured version of the decorative laminate 10 (see FIG. 7) applied on the structural composite panels 28*b* (see FIG. 7).

As further shown in FIG. 7, non-decorative information or markings, such as assembly positional targets 102*c*, comprised of non-visible light activated material 82 may be included on the positional system pattern 100 of each decorative laminate 10, such as in the form of decorative laminate 10*d*. FIG. 7 shows the assembly positional targets 102*c* along an alignment seam 106 formed between the two decorative laminates 10 of the two respective structural composite panels 28*b* to facilitate alignment and positioning of the decorative laminates 10 and the structural composite panels 28*b* with one another.

When illuminated with the light source 112 (see FIGS. 8B, 9A), such as an ultraviolet (UV) light source 112*a* (see FIG. 9A), an infrared (IR) light source 112*b* (see FIG. 9A), or another suitable light source, the assembly positional targets 102*c* (see FIG. 7) may provide assemblers, assembly-related users, or other users, with visible target reference points for aligning the decorative laminates 10 (see FIG. 7) on each structural composite panel 28*b* (see FIG. 7) with one another. In addition, the assembly positional targets 102*c* (see FIG. 7) remain intact and do not get trimmed off of the final manufactured or assembled version of the decorative laminate 10 (see FIG. 7) applied on the structural composite panels 28*b* (see FIG. 7).

In addition to the manufacturing positional targets 102*a*, 102*b* and the assembly positional targets 102*c*, the non-visible light activated material 82 (see FIGS. 9A, 9B) may be deposited or printed on the decorative laminate 10 (see FIGS. 9A, 9B) in the form of other non-decorative information or markings, such as part numbers, bar codes, repair instructions, or other non-decorative information, to locate and identify structural components for inspection, repair, removal, maintenance, or other procedure. By having such information or markings on the visible surface or top portion 98a (see FIG. 7) of the decorative laminate 10 (see FIG. 7), and only being visible when illuminated by the light source 112 (see FIG. 9A), the information or markings may be easily located and accessed, and may result in decreased time, labor and costs for inspection, repair, removal, and/or maintenance of structures 27 (see FIG. 9C), such as composite structures 27a (see FIG. 9C), for example, composite panels 27b (see FIG. 9C).

Figure 8A:
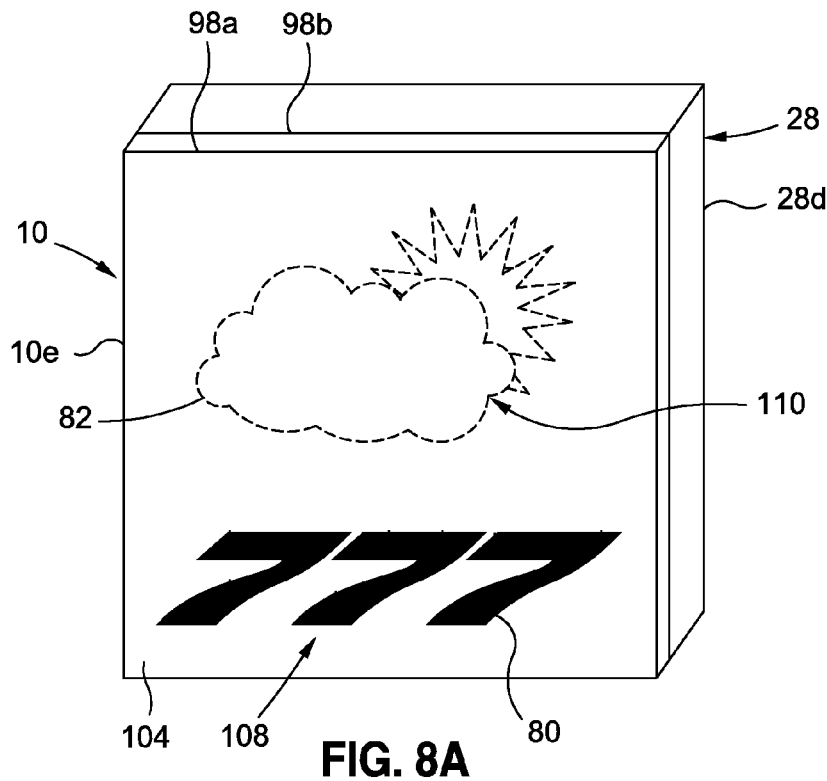
FIG. 8A is an illustration of a front perspective view of an aircraft interior structural component having an embodiment of a decorative laminate showing a first theme that is visible and a second theme that is non-visible.
Figure 8B:
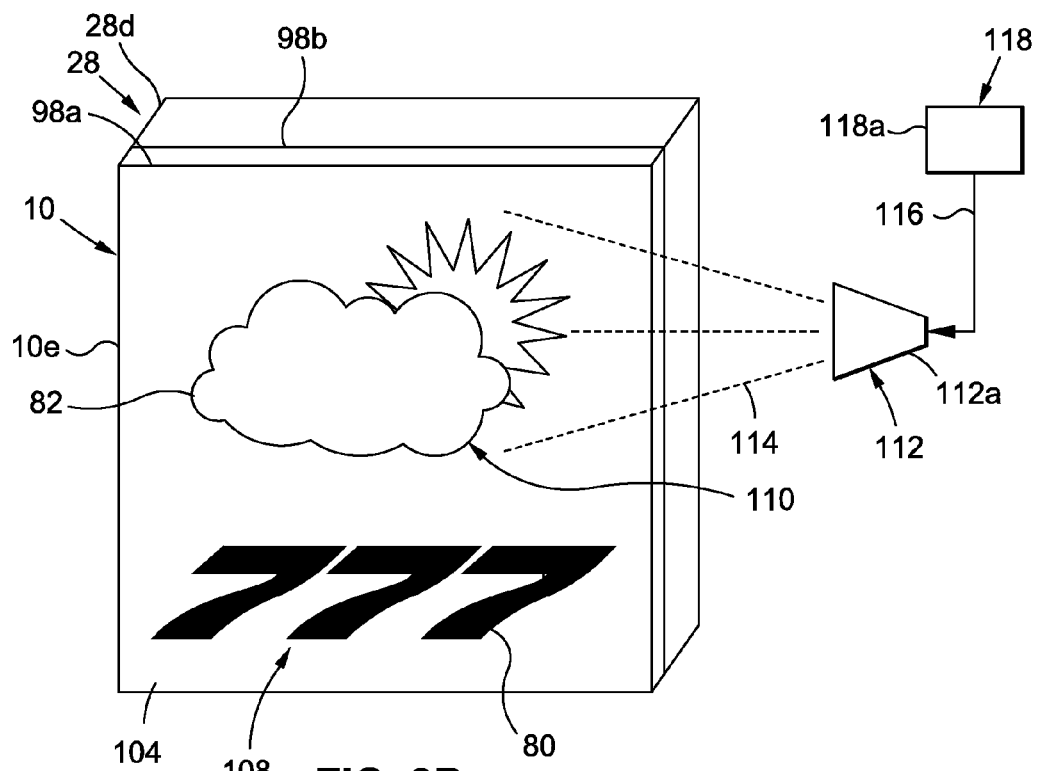
FIG. 8B is an illustration of a front perspective view of the aircraft interior structural component having the decorative laminate of FIG. 8A, showing the first theme that is visible and showing the second theme that is visible when exposed to a lighting source.

Referring now to FIGS. 8A-8B, FIG. 8A is an illustration of a front perspective view of a structural component 28, such as in the form of an aircraft interior structural component 28d, having an embodiment of a decorative laminate 10, such as in the form of decorative laminate 10e, showing a first theme 108, e.g., the number "777", such as an image or design, that is visible and showing a second theme 110, e.g., sun and cloud, such as an image or design, that is non-visible. FIG. 8B is an illustration of a front perspective view of the structural component 28, such as in the form of aircraft interior structural component 28d, having the embodiment of the decorative laminate 10, such as in the form of decorative laminate 10e, of FIG. 8A, showing the first theme 108, e.g., the number "777", that is visible, and showing the second theme 110, e.g., sun and cloud, that is visible when exposed to and illuminated by a lighting source 112.

As shown in FIGS. 8A-8B, each decorative laminate 10, such as in the form of decorative laminate 10e, has a top portion 98a, a base portion 98b, and a decorative area 104. As further shown in FIGS. 8A-8B, the visible material 80 forms the first theme 108, e.g., the number "777", and the non-visible light activated material 82 forms the second theme 110, e.g., sun and cloud. The second theme 110 (see FIGS. 7, 9B) may be separate and distinct from the first theme 108 (see FIGS. 7, 9B). Alternatively, the second theme 110 (see FIG. 9B) may augment the first theme 108 (see FIG. 9B), that is, the second theme 110 (see FIG. 9B) may be part of, connected to, or highlight the first theme 108 (see FIG. 9B) in some manner.

In FIG. 8A, the first theme 108 comprised of visible material 80 is visible, and the second theme 110 comprised of non-visible light activated material 82 is non-visible and in a non-visible state 120 (see FIG. 9B) or condition. In FIG. 8B, the first theme 108 comprised of visible material 80 is visible, and the second theme 110 comprised of non-visible light activated material 82 is now visible via illumination 114 from and exposure to the light source 112, such as in the form of ultraviolet (UV) light source 112a. In FIG. 8B, the second theme 110 has changed from the non-visible state 120 (see FIG. 9B) to the visible state 122 (FIG. 9B) with exposure to the light source 112.

As further shown in FIG. 8B, a lighting system 118, such as in the form of an aircraft lighting system 118a, is coupled to or connected to the light source 112 via a connection element 116, such as a wired or wireless connection. The light source 112 (see FIG. 8B), such as ultraviolet (UV) light source 112a (see FIG. 8B) is configured to illuminate and change the non-visible light activated material 82 (see FIG. 8B) from the non-visible state 120 (see FIG. 9B) to the visible state 122 (see FIG. 9B). The light source 112 (see FIG. 8B) may also comprise an infrared (IR) light source 112b (see FIG. 9A), a light-emitting diode (LED) light source, or another suitable light source.

With embodiments of the decorative laminates 10, such as decorative laminates 10e, and other embodiments disclosed herein, that are applied to structural components 28 (see FIGS. 8A-8B), such as aircraft interior structural components 28d (see FIGS. 8A-8B), branding features to improve interior branding opportunities, and decorative patterns or other decorative elements to improve the aesthetics of the interior space or area, may be printed on the decorative laminates 10 (see FIGS. 8A-8B). The decorative laminates 10 (see FIGS. 8A-8B, 9A) are configured to allow for multiple interior decorative designs or branding features on the same decorative area 104 (see FIGS. 8A-8B), or within the same space or area, that may be selectively visible or non-visible.

Referring now to FIG. 9A, FIG. 9A is an illustration of a functional block diagram of an embodiment of a decorative laminate system 11 of the disclosure. As shown in FIG. 9A, the decorative laminate system 11 comprises a structure 27, such as a structural component 28, in the form of an interior structural component 28a, having a bonding surface 96.

As shown in FIG. 9A, the decorative laminate system 11 further comprises an adhesive layer 90 disposed between the decorative laminate 10 and the bonding surface 96 of the interior structural component 28a. The decorative laminate 10 (see FIG. 9A) is preferably applied to the bonding surface 96 (see FIG. 9A) of the interior structural component 28a (see FIG. 9A) via the adhesive layer 90 (see FIG. 9A).

As shown in FIG. 9A, the decorative laminate system 11 further comprises the decorative laminate 10 having multiple laminate layers 62, a decorative layer 76, and a resin layer 84. The multiple laminate layers 62 (see FIG. 9A) comprise a first laminate layer 62a (see FIG. 9A) having a transparent appearance 68 (see FIG. 9A), a second laminate layer 62b (see FIG. 9A) having an opaque appearance 72 (see FIG. 9A), optionally a third laminate layer 62c (see FIG. 9A) that preferably has an opaque appearance 72 (see FIG. 9A), and optionally, one or more additional laminate layers 62 (see FIG. 9A). The decorative laminate 10 (see FIG. 9A) preferably comprises a top portion 98a (see FIG. 9A), or top sheet, and may comprise a base portion 98b (see FIG. 9A), or base layer.

The laminate layers 62 (see FIG. 9A) each comprise a thermoplastic fluoropolymer material 74 (see FIG. 9A) consisting of polyvinyl fluoride (PVF) film 74a (see FIG. 9A), polyvinylidene fluoride (PVDF) film 74b (see FIG. 9A), integral color polyvinyl fluoride (PVF) film 74c (see FIG. 9A), and polyvinyl fluoride (PVF) film/aluminum foil/adhesive material 74d (see FIG. 9A), or another suitable thermoplastic fluoropolymer material 74 (see FIG. 9A). The third laminate layer 62c (see FIGS. 5A, 6A) or additional laminate layers 62 (see FIG. 9A) may preferably be disposed adjacent to either the first side 88a (see FIG. 6A) of the resin layer 84, or to the second side 88b (see FIG. 5A) of the resin layer 84 (see FIGS. 5A, 6A).

As shown in FIG. 9A, the decorative laminate system 11 further comprises the decorative layer 76, such as in the form of decorative ink layer 76a, and comprising one or more visible materials 80 and one or more non-visible light activated materials 82. The one or more visible materials 80 (see FIG. 9A) may comprise a first theme 108 (see FIG. 9A) on the decorative area 104 (see FIG. 9A) of the decorative laminate 10 (see FIG. 9A), and the one or more non-visible light activated materials 82 (see FIG. 9A) may comprise a second theme 110 (see FIG. 9A) on the decorative area 104 (see FIG. 9A) of the decorative laminate 10 (see FIG. 9A).

As further shown in FIG. 9A, the decorative layer 76 of the decorative laminate 10 may further comprise a positional system pattern 100, such as an alignment pattern 100a. The positional system pattern 100 (see FIG. 9A) may comprise manufacturing positional targets 102a, 102b (see FIGS. 7, 9A) and assembly positional targets 102c (see FIGS. 7, 9A) along an alignment seam 106 (see FIGS. 7, 9A). The one or more non-visible light activated materials 82 (see FIGS. 7, 9A) may be deposited in the alignment pattern 100a (see FIGS. 7, 9A) that facilitate alignment of the decorative laminate 10 (see FIGS. 7, 9A) when applied to the structural component 28 (see FIG. 9A), such as in the form of structural composite panel 28b (see FIG. 7).

As shown in FIG. 9A, the decorative laminate system 11 further comprises a lighting system 118, such as an aircraft lighting system 118a, having a light source 112 configured to illuminate and change the one or more non-visible light activated materials 82 from the non-visible state 120 to the visible state 122. The light source 112 (see FIG. 9A) preferably comprises an ultraviolet (UV) light source 112a (see FIG. 9A), an infrared (IR) light source 112b (see FIG. 9A), or another suitable light source 112 (see FIG. 9A). The light source 112 (see FIG. 9A) provides illumination 114 (see FIG. 9A) to the one or more non-visible light activated materials 82 (see FIG. 9A) and may preferably be coupled to or connected to the lighting system 118 (see FIG. 9A) via a connection element 116 (see FIG. 9A).

Referring now to FIG. 9B, FIG. 9B is an illustration of a functional block diagram of embodiments of the decorative layer 76, the resin layer 84, and then adhesive layer 90 of the decorative laminate system 11 of FIG. 9A.

The decorative layer 76 (see FIG. 9B) may be in the form of a decorative ink layer 76a (see FIG. 9B). As shown in FIG. 9B, and as discussed above, the decorative layer 76, comprises one or more visible materials 80 that preferably comprise a first theme 108, such as a design or image, that is visible. As further shown in FIG. 9B, the one or more visible materials 80 preferably comprise one or more of a visible ink jet printed ink 80a, a visible silk screen printed ink 80b, a visible pigment-based ink 80c, a visible dye-based ink 80d, a visible paint 80e, a visible stain 80f, or a visible digital printed ink 80g. The visible materials 80 may further comprise another suitable visible colored, ink, or pigment material.

As further shown in FIG. 9B, and as discussed above, the decorative layer 76 comprises one or more non-visible light activated materials 82 that preferably comprise a second theme 110, such as a design or image, that is non-visible and is configured to change from the non-visible state 120 to the visible state 122, when exposed to the light source 112 (see FIG. 9A).

As further shown in FIG. 9B, the one or more non-visible light activated materials 82 preferably comprise one or more of a non-visible ink jet printed ink 82a, a non-visible silk screen printed ink 82b, a non-visible pigment-based ink 82c, a non-visible dye-based ink 82d, a non-visible paint 82e, a non-visible stain 82f, or a non-visible digital printed ink 82g. The non-visible light activated materials 82 may further comprise another suitable non-visible colored, ink, or pigment material. Each of the non-visible light activated materials 82 is configured to change from the non-visible state 120 to the visible state 122 when exposed to the light source 112.

As further shown in FIG. 9B, the one or more visible materials 80 and the one or more non-visible light activated materials 82 of the decorative layer 76 may be deposited or printed on the first laminate layer 62a or other suitable laminate layer 62 via printing process 124. The printing process 124 (see FIG. 9B) may comprise an ink jet printing process 124a (see FIG. 9B), a silk screen printing process 124b (see FIG. 9B), a digital printing process 124c (see FIG. 9B), a three-dimensional (3D) printing process 124d (see FIG. 9B), or another suitable printing process 124 (see FIG. 9B).

As further shown in FIG. 9B, and as discussed above, the resin layer 84 of the decorative laminate 10 (see FIG. 9A) in the decorative laminate system 11 (see FIG. 9A), preferably comprises an emboss resin layer 84a or a prepreg resin layer 84b. The resin layer 84 may further comprise another suitable resin or resin-based layer. As further shown in FIG. 9B, the emboss resin layer 84a preferably comprises one or more thermoset resin materials 86 consisting of epoxies 86a, polyesters 86b, phenols 86c, polyurethanes 86d, or a combination thereof. The emboss resin layer 84a may further comprise another suitable thermoset resin material.

As discussed above, the adhesive layer 90 of the decorative laminate system 11 (see FIG. 9A), is preferably disposed between the decorative laminate 10 (see FIG. 9A) and the bonding surface 96 (see FIG. 9A) of the structural component 28 (see FIG. 9A). In one embodiment, the adhesive layer 90 may comprise a pressure sensitive adhesive 90a applied or integrated with the decorative laminate 10 (see FIG. 9A). The pressure sensitive adhesive 90a (see FIG. 9B) preferably has a release liner 94 (see FIG. 9B) that may be removed and discarded when the decorative laminate 10 (see FIG. 9A) is applied to the structural component 28 (see FIG. 9A).

In another embodiment, the adhesive layer 90 (see FIG. 9B) may comprise a spray glue 90b or other suitable spray or liquid adhesive material. Preferably, the spray glue 90b is applied to the bonding surface 96 (see FIG. 9A) of the structural component 28 (see FIG. 9A), when the decorative laminate 10 (see FIG. 9A) is applied to the structural component 28 (see FIG. 9A).

Figure 9C:
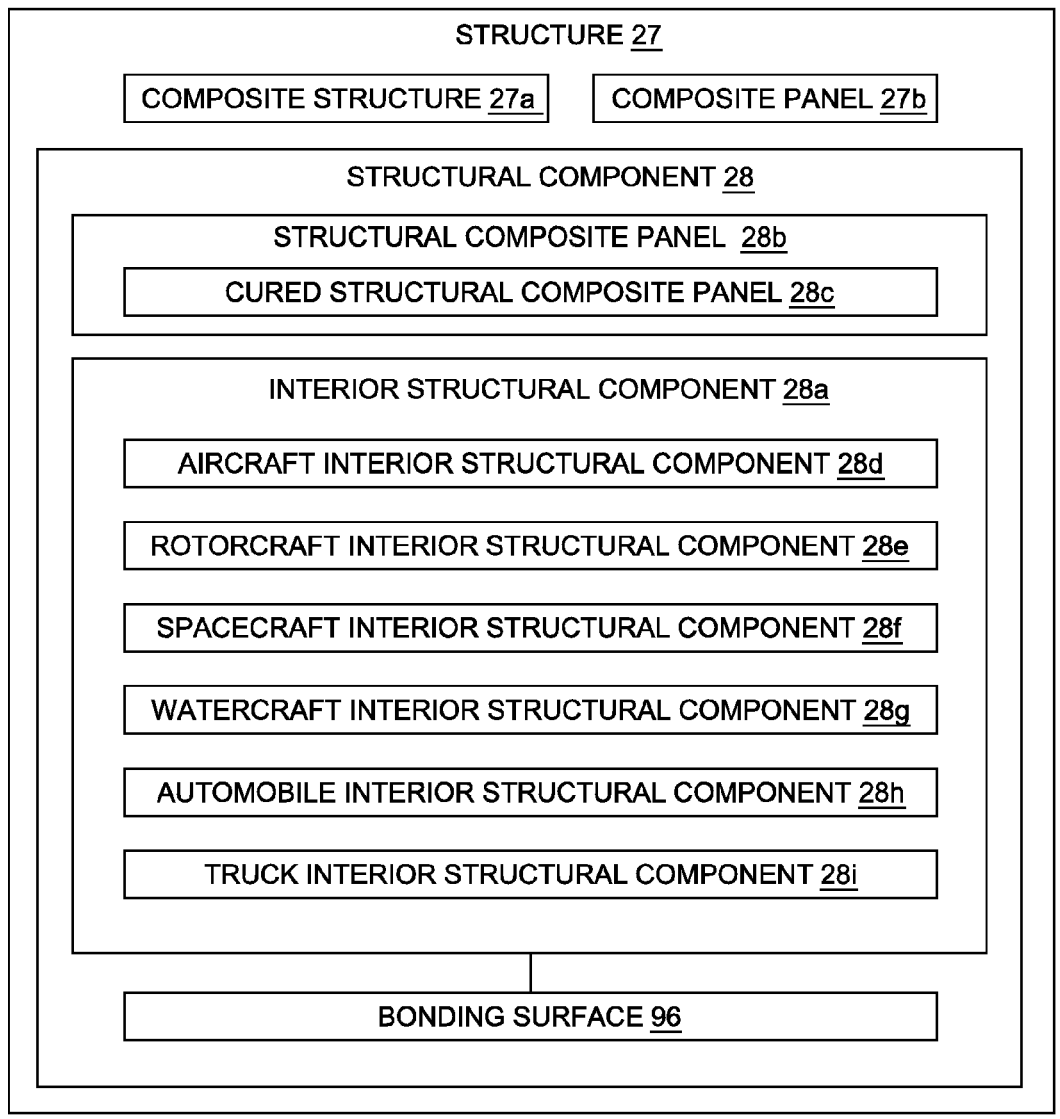
FIG. 9C is an illustration of a functional block diagram of embodiments of a structural component of the decorative laminate system of FIG. 9A.

Referring now to FIG. 9C, FIG. 9C is an illustration of a functional block diagram of the structure 27 of the decorative laminate system 11 of FIG. 9A showing embodiments of the structural component 28. As shown in FIG. 9C, the structure 27 preferably comprises a composite structure 27a, such as in the form of a composite panel 27b. As further shown in FIG. 9C, the structure 27 comprises a structural component 28. As further shown in FIG. 9C, the structural component 28 may comprise the interior structural component 28a, the structural composite panel 28b, the cured structural composite panel 28c, the aircraft interior structural component 28d, a rotorcraft interior structural component 28e, a spacecraft interior structural component 28f, a watercraft interior structural component 28g, an automobile interior structural component 28h, or a truck interior structural component 28i.

The structure 27 (see FIG. 9C) and the structural component 28 (see FIG. 9C) may also comprise other suitable structures or structural components configured to receive decorative laminates. As further shown in FIG. 9C, the structure 27, the structural component 28, and the embodiments of the structural component 28 have the bonding surface 96 for bonding to the decorative laminate 10 (see FIG. 9A).

Figure 10:
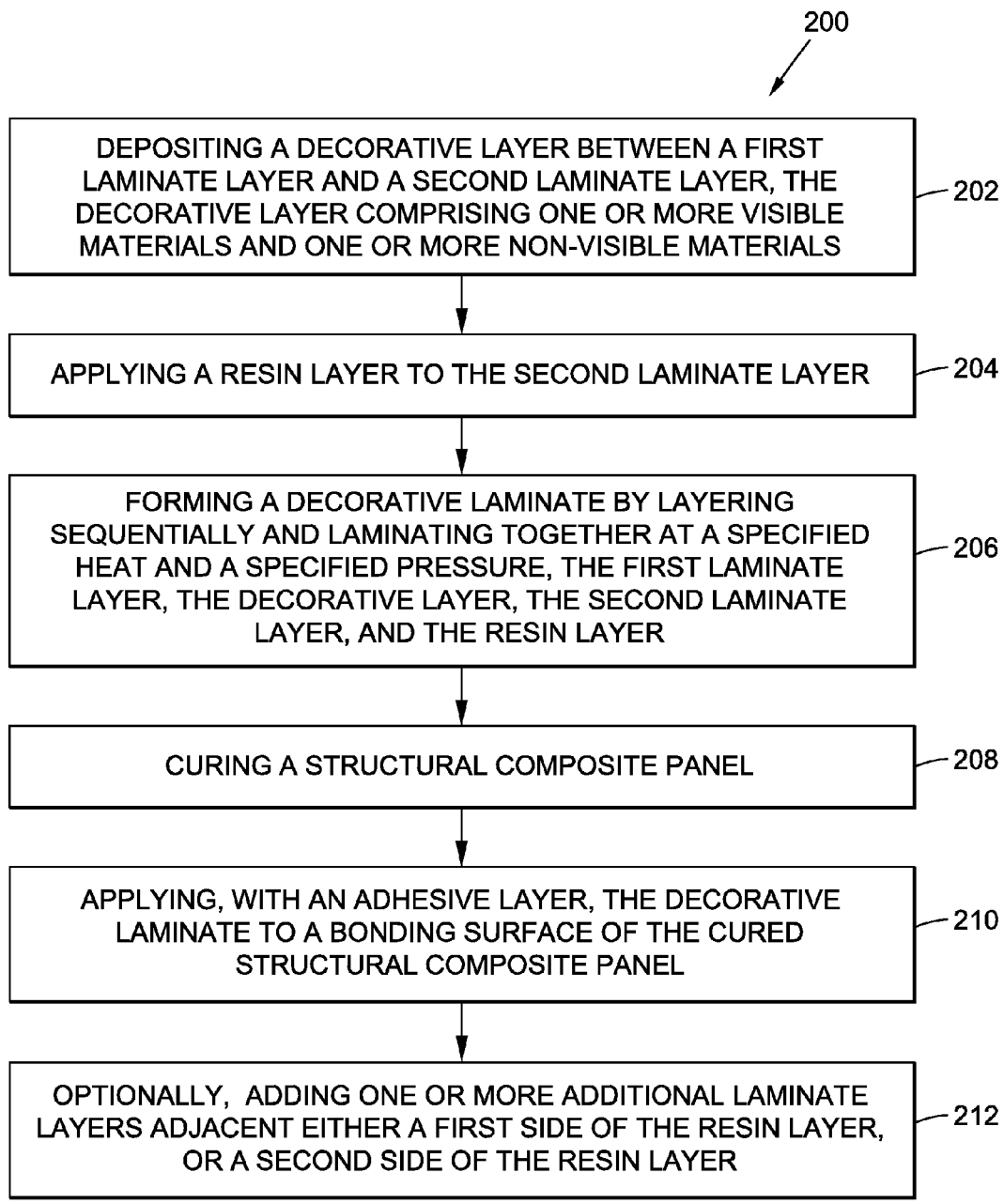
FIG. 10 is an illustration of a flow diagram of an embodiment of a method of the disclosure.

In another embodiment, there is provided a method 200 (see FIG. 10) of making a composite panel 27b (see FIG. 9C) having a decorative laminate 10 (see FIG. 9A) applied thereto. FIG. 10 is an illustration of a flow diagram of an embodiment of the method 200 of the disclosure.

As shown in FIG. 10, the method 200 comprises step 202 of depositing a decorative layer 76 (see FIGS. 4A-4B, 9A) between a first laminate layer 62a (see FIGS. 4A-4B, 9A) and a second laminate layer 62b (see FIGS. 4A-4B, 9A). The decorative layer 76 (see FIGS. 4A-4B, 9B) comprises one or more visible materials 80 (see FIGS. 4A-4B, 9B). The decorative layer 76 (see FIGS. 4A-4B, 9B) further comprises one or more non-visible light activated materials 82 (see FIGS. 4A-4B, 9B) that change from a non-visible state 120 (see FIG. 9B) to a visible state 122 (see FIG. 9B), when exposed to a light source 112 (see FIGS. 8B, 9A). The light source 112 (see FIGS. 8B, 9A) comprises an ultraviolet (UV) light source 112a (see FIGS. 8B, 9A), an infrared (IR) light source 112b (see FIG. 9A), or another suitable light source 112 (see FIG. 9A).

The step 202 (see FIG. 10) of depositing the decorative layer 76 (see FIGS. 4A-4B, 9A) between the first laminate layer 62a (see FIGS. 4A-4B, 9A) and the second laminate layer 62b (see FIGS. 4A-4B, 9A) preferably comprises depositing the decorative layer 76 (see FIGS. 4A-4B, 9A) via a printing process 124 (see FIG. 9B). The printing process 124 (see FIG. 9B) preferably comprises an ink jet printing process 124a (see FIG. 9B), a silkscreen printing process 124b (see FIG. 9B), a digital printing process 124c (see FIG. 9B), a three-dimensional (3D) printing process 124d (see FIG. 9B), or another suitable printing process 124 (see FIG. 9B).

The step 202 of depositing the decorative layer 76 (see FIGS. 4A-4B, 9A) between the first laminate layer 62a (see FIGS. 4A-4B, 9A) and the second laminate layer 62b (see FIGS. 4A-4B, 9A) further comprises depositing one or more of the non-visible light activated materials 82 (see FIGS. 7, 9A) in an alignment pattern 100a (see FIGS. 7, 9A) to facilitate alignment of the decorative laminate 10 (see FIGS. 7, 9A), when applied to the cured structural composite panel 28c (see FIG. 9C).

As shown in FIG. 10, the method 200 further comprises step 204 of applying a resin layer 84 (see FIGS. 4A-4B, 9A) to the second laminate layer 62b (see FIGS. 4A-4B, 9A).

As shown in FIG. 10, the method 200 further comprises step 206 of forming a decorative laminate 10 (see FIGS. 4A-4B, 9A) by layering sequentially and laminating together at a specified heat and a specified pressure the first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A).

As shown in FIG. 10, the method 200 further comprises step 208 of curing a structural composite panel 28b (see FIG. 9C) to form a cured structural composite panel 28c (see FIG. 9C).

The step 206 (see FIG. 10) of forming the decorative laminate 10 (see FIGS. 4A-4B, 9A) comprises preferably using a press forming process to heat and cure the first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A) at a specified heat, such as an effective elevated temperature, and at a specified pressure, such as an effective pressure, for an effective period of time to form the decorative laminate 10 (see FIGS. 4A-4B, 9A). The first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A) are preferably layered and laid up on a flat configuration, such as a flat metal caul plate or the like, in large sheets, e.g., 5 feet by 8 feet. The large sheets are preferably heated and cured in a multiple opening press, such as with flat platens, used in the press forming process.

The effective elevated temperature for heating and curing the first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A) may be in a range of from about 200° F. (two hundred degrees Fahrenheit) to about 400° F. (four hundred degrees Fahrenheit), or more. The effective period of time for heating and curing the first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A) may be in a range of from about 10 (ten) minutes to about 120 (one hundred twenty) minutes, or more. The effective pressure for heating and curing the first laminate layer 62a (see FIGS. 4A-4B, 9A), the decorative layer 76 (see FIGS. 4A-4B, 9A), the second laminate layer 62b (see FIGS. 4A-4B, 9A), and the resin layer 84 (see FIGS. 4A-4B, 9A) may be at a high pressure, for example, in a range of from about 50 psi (fifty pounds per square inch) to about 200 psi (two hundred pounds per square inch). The temperature, pressure, and time selected for the heating and curing is preferably selected based on the type of resin layer 84 (see FIGS. 4A-4B, 9A) used in the forming the decorative laminate 10 (see FIGS. 4A-4B, 9A), for example, a thermoset resin or a thermoplastic resin used, or the type of thermoset resin or type of thermoplastic resin used.

The large sheets of the laid up first laminate layer 62a (see FIGS. 4A-4B, 9A), decorative layer 76 (see FIGS. 4A-4B, 9A), second laminate layer 62b (see FIGS. 4A-4B, 9A), and resin layer 84 (see FIGS. 4A-4B, 9A) may be heated and cured in a multiple opening press at a pressure in a range of from about 50 psi (fifty pounds per square inch) to about 200 psi (two hundred pounds per square inch), at a temperature in a range of from about 200° F. (two hundred degrees Fahrenheit) to about 400° F. (four hundred degrees Fahrenheit), and at a time in a range of from about 10 (ten) minutes to about 120 (one hundred twenty) minutes. The decorative laminate 10 (see FIGS. 4A-4B, 9A) is preferably cooled in the multiple opening press to ambient temperature for a sufficient time period and then removed for application to the structural component 28 (see FIGS. 1, 4A-4B), such as aircraft interior structural component 28d (see FIGS. 1, 9C). The decorative laminate 10 (see FIGS. 4A-4B, 9A) may also be formed with other known press forming processes.

As shown in FIG. 10, the method 200 further comprises step 210 of applying, with an adhesive layer 90 (see FIGS. 4A-4B, 9A), the decorative laminate 10 (see FIGS. 4A-4B, 9A) to a bonding surface 96 (see FIGS. 4A-4B, 9A) of the cured structural composite panel 28c (see FIG. 9C) to form the composite panel 27b (see FIG. 9C) having the decorative laminate 10 (see FIG. 9A) applied thereto. The adhesive layer 90 (see FIG. 9B) may comprise a pressure sensitive adhesive 90a (see FIG. 9B) with a release liner 94 (see FIG. 9B), a spray glue 90b, or another suitable adhesive material.

The step 210 (see FIG. 10) of applying, with an adhesive layer 90 (see FIGS. 4A-4B, 9A), the decorative laminate 10 (see FIGS. 4A-4B, 9A) to the bonding surface 96 (see FIGS. 4A-4B, 9A) of the cured structural composite panel 28c (see FIG. 9C) to form the composite panel 27b (see FIG. 9C) having the decorative laminate 10 (see FIG. 9A) applied thereto, further comprises applying the decorative laminate 10 (see FIGS. 4A-8B, 9A) to the structural component 28 (see FIGS. 4A-8B, 9C), where the structural component 28 (see FIGS. 4A-8B, 9C) comprises the interior structural component 28a (see FIG. 9C), the structural composite panel 28*b* (see FIG. 9C), the cured structural composite panel 28*c* (see FIG. 9C), the aircraft interior structural component 28*d* (see FIG. 9C), a rotorcraft interior structural component 28*e* (see FIG. 9C), a spacecraft interior structural component 28*f* (see FIG. 9C), a watercraft interior structural component 28*g* (see FIG. 9C), an automobile interior structural component 28*h* (see FIG. 9C), or a truck interior structural component 28*i* (see FIG. 9C).

The step 210 (see FIG. 10) of applying, with an adhesive layer 90 (see FIGS. 4A-4B, 9A), the decorative laminate 10 (see FIGS. 4A-4B, 9A) to the bonding surface 96 (see FIGS. 4A-4B, 9A) of the cured structural composite panel 28*c* (see FIG. 9C) to form the composite panel 27*b* (see FIG. 9C) having the decorative laminate 10 (see FIG. 9A) applied thereto, further comprises applying the decorative laminate 10 (see FIGS. 4A-8B, 9A) to one or more of a flat surface, a curved surface, a contoured surface, or another suitable surface, of the structural component 28 (see FIGS. 1, 4A-6B, 9C), such as an interior structural component 28*a* (see FIGS. 4A-6B, 9C).

As shown in FIG. 10, the method 200 further comprises the optional step 212 of adding one or more additional laminate layers 62 (see FIGS. 5A-6B, 9A) adjacent either the first side 88*a* (see FIGS. 5A, 6A) of the resin layer 84 (see FIGS. 4A-4B, 9A), or the second side 88*b* (see FIGS. 5A, 6A) of the resin layer 84 (see FIGS. 4A-4B, 9A).

Additionally, optional flame retardant material or other decorative laminate materials may be added to the decorative laminate 10 (see FIG. 9A). Further, the decorative laminate 10 (see FIG. 9A) may be applied to the structural component 28 (see FIG. 9A), such as interior structural component 28*a* (see FIG. 9A), using known processes such as thermoforming, vacuum forming, or another suitable known application process for applying the decorative laminate 10 (see FIG. 9A) to the structural component 28 (see FIG. 9A), such as interior structural component 28*a* (see FIG. 9A).

Disclosed embodiments of the decorative laminate 10 (see FIGS. 4A-8B, 9A), the decorative laminate system 11 (see FIG. 9A), and method 200 (see FIG. 10) provide numerous advantages over known decorative laminates, decorative laminate systems, and methods of using the same, and in particular, incorporate or integrate non-visible light activated materials 82 (see FIG. 9A), such as ultraviolet light sensitive non-visible or invisible inks, or glowing ink, directly into the decorative laminates 10 (see FIGS. 5A-8B, 9A).

Further, disclosed embodiments of the decorative laminate 10 (see FIGS. 4A-8B, 9A), the decorative laminate system 11 (see FIG. 9A), and method 200 (see FIG. 10) use non-visible light activated materials 82 (see FIG. 9A) to provide target reference points to obtain a position from a random printed pattern, where there were no target reference points previously, and to provide a method of aligning decorative laminates 10 (see FIG. 7). The non-visible light activated material 82 (see FIGS. 9A, 9B) may be deposited or printed directly on the decorative area 104 (see FIG. 7) of the decorative laminate 10 (see FIGS. 9A, 9B), such as in the form of a positional system pattern 100 (see FIG. 7) with an alignment pattern 100*a* (see FIG. 7), including manufacturing positional targets 102*a*, 102*b* (see FIG. 7), or assembly positional targets 102*c* (see FIG. 7), or other non-decorative information or markings, such as part numbers, bar codes, repair instructions, station values, or other non-decorative information. Such non-decorative information or markings allow repair, maintenance, and inspection crews to quickly locate and identify structural components for repair, removal, maintenance, or inspection. By having such information or markings on the visible surface or top portion 98*a* (see FIG. 7) of the decorative laminate 10 (see FIG. 7), and only being visible when illuminated by the light source 112 (see FIG. 9A), the information or markings may be easily located and accessed, and may result in decreased time, labor and costs for repair, maintenance, and/or inspection of structures 27 (see FIG. 9C), such as composite structures 27*a* (see FIG. 9C), for example, composite panels 27*b* (see FIG. 9C).

Further, disclosed embodiments of the decorative laminate 10 (see FIGS. 4A-8B, 9A), the decorative laminate system 11 (see FIG. 9A), and method 200 (see FIG. 10) provide a decorative laminate 10 (see FIGS. 4A-8B, 9A) that allows for inclusion of non-decorative information or markings directly on a decorative area 104 (see FIG. 9A), rather than outside of a decorative area 104 (see FIG. 9A). Thus, any trimming or removal of the information on the decorative laminate 10 (see FIGS. 4A-8B, 9A) is avoided during manufacturing or assembly of the decorative laminate 10 (see FIGS. 4A-8B, 9A) into a finished product. Since the positional reference markings or labels are not removed from the finished product, later inspections to determine whether a decorative laminate 10 (see FIGS. 4A-8B, 9A) has been applied correctly may be conducted easily and quickly. In addition, because the positional system pattern 100 (see FIG. 7) with alignment pattern 100*a* (see FIG. 7) allow the decorative laminates 10 (see FIGS. 7, 9A) to be aligned properly on the composite panels, misalignment may be avoided and scrapping of the decorative laminates 10 (see FIGS. 5A-8B, 9A) may be avoided. This may, in turn, result in increased manufacturing efficiency and decreased manufacturing time and costs.

In addition, disclosed embodiments of the decorative laminate 10 (see FIGS. 4A-8B, 9A), the decorative laminate system 11 (see FIG. 9A), and method 200 (see FIG. 10) allow for multiple interior designs on the same decorative area 104 (see FIGS. 7, 8), or within the same interior space or area, and improve the design aesthetics and branding opportunities in the decorative area 104 (see FIGS. 7, 8), or within the same interior space or area.

For example, the decorative laminates 10 (see FIGS. 4A-8B, 9A) applied to structures 27 (see FIG. 9A), such as structural components 28 (see FIG. 9A), including aircraft interior structural components 28*d* (see FIG. 9C), may be printed with branding features, patterns, or other decorative elements to improve interior branding opportunities or to improve the aesthetics in the decorative area 104 (see FIGS. 7, 8), or in the interior space or area, and provide for multiple interior designs or branding features on the same decorative area 104 (see FIGS. 7, 8), or within the same interior space or area. Further, disclosed embodiments of the decorative laminate 10 (see FIGS. 4A-8B, 9A), the decorative laminate system 11 (see FIG. 9A), and method 200 (see FIG. 10) provide for interior designs or branding features that are visible in certain types of light, e.g., ultraviolet (UV) light, or infrared (IR) light, or LED (light-emitting diode) lights, and non-visible in other types of light. The UV, IR, or LED lights may be incorporated into a lighting system 118 (see FIG. 9A), such as aircraft lighting system 118*a* (see FIG. 9A), that are already using such UV, IR, or LED lights, or other types of light activating lights. Thus, existing lighting systems may be retrofitted or modified to include such lights, or existing lighting systems having such lights may be used to create a desired lighting design or effect.

Moreover, interior branding opportunities in aircraft 12*a* (see FIG. 1) may be valuable. For example, UV, IR, or LED lights in an aircraft cabin may be activated to reveal brightly lit logos, patterns, or other decorative elements that would have previously been invisible to the naked eye, thus allowing aircraft to display or carry dual interior designs or images within the same aircraft cabin or interior space. For example, a single aircraft 12a (see FIG. 1) may display a typical interior with clean lines and soft colors for a relaxing atmosphere on a morning flight, and then switch to UV lighting to activate a brilliantly lit, dramatic interior for an evening flight.

In addition, disclosed embodiments of the decorative laminate 10 (see FIGS. 4A-8B, 9A), the decorative laminate system 11 (see FIG. 9A), and method 200 (see FIG. 10) allow for decorative inks or printing inks to be tailored to different wavelengths of light. For example, one wavelength of light, such as a longer wavelength, may be used for a calming passenger experience, and a different shorter wavelength of light may be used for the manufacturing side or for a higher energy experience.

Further, disclosed embodiments of the decorative laminate 10 (see FIGS. 4A-8B, 9A), the decorative laminate system 11 (see FIG. 9A), and method 200 (see FIG. 10) allow for incorporating or integrating the decorative layer 76 (see FIGS. 4A-8B, 9A), including the non-visible light activated material 82 (see FIGS. 4A-8B, 9A), within the decorative laminate 10 (see FIGS. 4A-8B, 9A), so that the decorative layer 76 (see FIGS. 4A-8B, 9A) is better protected from heat and direct contact to avoid being scratched off or damaged.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A decorative laminate comprising:
   a first laminate layer;
   a second laminate layer;
   a decorative layer disposed selectively between the first laminate layer and the second laminate layer, the decorative layer comprising:
      one or more visible materials; and
      one or more non-visible light activated materials that change from a non-visible state to a visible state, when exposed to a light source, the light source comprising an ultraviolet (UV) light source or an infrared (IR) light source; and
   a resin layer disposed on the second laminate layer,
   wherein the first laminate layer and the second laminate layer each comprise a thermoplastic fluoropolymer material selected from the group consisting of polyvinyl fluoride (PVF) film, polyvinylidene fluoride (PVDF) film, integral color polyvinyl fluoride (PVF) film, and polyvinyl fluoride (PVF) film/aluminum foil/adhesive material, and
   wherein the first laminate layer, the decorative layer, the second laminate layer, and the resin layer are laminated together to form the decorative laminate configured for application to a structural component.

2. The decorative laminate of claim 1 further comprising an adhesive layer disposed between the decorative laminate and a bonding surface of the structural component.

3. The decorative laminate of claim 1 further comprising one or more additional laminate layers adjacent a first side of the resin layer.

4. The decorative laminate of claim 1 further comprising one or more additional laminate layers adjacent a second side of the resin layer.

5. The decorative laminate of claim 1 wherein the one or more non-visible light activated materials are deposited in an alignment pattern that facilitate alignment of the decorative laminate when applied to the structural component.

6. The decorative laminate of claim 1 wherein the one or more visible materials comprise one or more of a visible ink jet printed ink, a visible silk screen printed ink, a visible pigment-based ink, a visible dye-based ink, a visible paint, a visible stain, and a visible digital printed ink.

7. The decorative laminate of claim 1 wherein the one or more non-visible light activated materials comprise one or more of a non-visible ink jet printed ink, a non-visible silk screen printed ink, a non-visible pigment-based ink, a non-visible dye-based ink, a non-visible paint, a non-visible stain, and a non-visible digital printed ink, each configured to change from the non-visible state to the visible state when exposed to the light source.

8. The decorative laminate of claim 1 wherein the one or more visible materials forms a first theme, and the one or more non-visible light activated materials forms a second theme separate and distinct from the first theme.

9. The decorative laminate of claim 1 wherein the one or more visible materials forms a first theme, and the one or more non-visible light activated materials augments the first theme.

10. The decorative laminate of claim 1 wherein the resin layer comprises an emboss resin layer or a prepreg resin layer, the emboss resin layer comprising one or more thermoset resin materials selected from the group consisting of epoxies, polyesters, phenols, polyurethanes, and a combination thereof.

11. The decorative laminate of claim 1 wherein the structural component comprises an interior structural component, a structural composite panel, an aircraft interior structural component, a rotorcraft interior structural component, a spacecraft interior structural component, a watercraft interior structural component, an automobile interior structural component, or a truck interior structural component.

12. A decorative laminate system comprising:
   a structural component having a bonding surface;
   a decorative laminate applied to the bonding surface of the structural component, the decorative laminate comprising:
      a first laminate layer having a transparent appearance;
      a second laminate layer having an opaque appearance, the first laminate layer and the second laminate layer each comprising a thermoplastic fluoropolymer material selected from the group consisting of polyvinyl fluoride (PVF) film, polyvinylidene fluoride (PVDF) film, integral color polyvinyl fluoride (PVF) film, and polyvinyl fluoride (PVF) film/aluminum foil/adhesive material;
      a decorative layer disposed between the first laminate layer and the second laminate layer, the decorative layer comprising:
         one or more visible materials; and
         one or more non-visible light activated materials;
      a resin layer disposed on the second laminate layer;
   an adhesive layer disposed between the decorative laminate and the bonding surface of the structural component; and a lighting system having a light source configured to illuminate and change the one or more non-visible light activated materials from a non-visible state to a visible state, the light source comprising an ultraviolet (UV) light source or an infrared (IR) light source.

13. The decorative laminate system of claim 12 wherein the decorative laminate further comprises one or more additional laminate layers adjacent either a first side of the resin layer, or a second side of the resin layer.

14. The decorative laminate system of claim 12 wherein the one or more visible materials comprise one or more of a visible ink jet printed ink, a visible silk screen printed ink, a visible pigment-based ink, a visible dye-based ink, a visible paint, a visible stain, and a visible digital printed ink.

15. The decorative laminate system of claim 12 wherein the one or more non-visible light activated materials comprise one or more of a non-visible ink jet printed ink, a non-visible silk screen printed ink, a non-visible pigment-based ink, a non-visible dye-based ink, a non-visible paint, a non-visible stain, and a non-visible digital printed ink, each configured to change from the non-visible state to the visible state when exposed to the light source.

16. The decorative laminate system of claim 12 wherein the structural component comprises an interior structural component, a structural composite panel, an aircraft interior structural component, a rotorcraft interior structural component, a spacecraft interior structural component, a watercraft interior structural component, an automobile interior structural component, or a truck interior structural component.

17. A method of making a composite panel having a decorative laminate applied thereto, the method comprising the steps of:
    depositing a decorative layer between a first laminate layer and a second laminate layer, wherein the first laminate layer and the second laminate layer each comprise a thermoplastic fluoropolymer material selected from the group consisting of polyvinyl fluoride (PVF) film, polyvinylidene fluoride (PVDF) film, integral color polyvinyl fluoride (PVF) film, and polyvinyl fluoride (PVF) film/aluminum foil/adhesive material, the decorative layer comprising:
        one or more visible materials; and
        one or more non-visible light activated materials that change from a non-visible state to a visible state, when exposed to a light source, the light source comprising an ultraviolet (UV) light source or an infrared (IR) light source;
    applying a resin layer to the second laminate layer;
    forming a decorative laminate by layering sequentially and laminating together at a specified heat and a specified pressure the first laminate layer, the decorative layer, the second laminate layer, and the resin layer;
    curing a structural composite panel to form a cured structural composite panel; and
    applying with an adhesive layer the decorative laminate to a bonding surface of the cured structural composite panel to form the composite panel having the decorative laminate applied thereto.

18. The method of claim 17 further comprising the step of adding one or more additional laminate layers adjacent either a first side of the resin layer, or a second side of the resin layer.

19. The method of claim 17 wherein the step of depositing the decorative layer between the first laminate layer and the second laminate layer further comprises depositing the decorative layer via an ink jet printing process, a silkscreen printing process, a digital printing process, or a three-dimensional (3D) printing process.

20. The method of claim 17 wherein the step of depositing the decorative layer between the first laminate layer and the second laminate layer further comprises depositing the one or more of the non-visible light activated materials in an alignment pattern to facilitate alignment of the decorative laminate, when applied to the cured structural composite panel.

* * * * *